United States Patent
Viteri

(10) Patent No.: US 6,945,029 B2
(45) Date of Patent: Sep. 20, 2005

(54) LOW POLLUTION POWER GENERATION SYSTEM WITH ION TRANSFER MEMBRANE AIR SEPARATION

(75) Inventor: Fermin Viteri, Sacramento, CA (US)

(73) Assignee: Clean Energy Systems, Inc., Rancho Cordova, CA (US)

(*) Notice: Subject to any disclaimer, the term of this patent is extended or adjusted under 35 U.S.C. 154(b) by 0 days.

(21) Appl. No.: 10/716,004

(22) Filed: Nov. 17, 2003

(65) Prior Publication Data

US 2004/0128975 A1 Jul. 8, 2004

Related U.S. Application Data

(60) Provisional application No. 60/426,866, filed on Nov. 15, 2002, provisional application No. 60/426,941, filed on Nov. 15, 2002, and provisional application No. 60/426,942, filed on Nov. 15, 2002.

(51) Int. Cl.⁷ .................................. F02C 3/30
(52) U.S. Cl. ............... 60/39.17; 60/39.52; 60/39.55
(58) Field of Search .................. 60/39.12, 39.17, 60/39.52, 39.55

(56) References Cited

U.S. PATENT DOCUMENTS

| | | |
|---|---|---|
| 864,017 A | 8/1907 | Miller |
| 886,274 A | 4/1908 | Tate |
| 1,013,907 A | 1/1912 | Taylor |
| 1,227,275 A | 5/1917 | Kraus |
| 1,372,121 A | 3/1921 | Davis |
| 1,820,755 A | 8/1931 | McMullen |
| 1,828,784 A | 10/1931 | Perrin |
| 2,004,317 A | 6/1935 | Forster |
| 2,033,010 A | 3/1936 | Russell |
| 2,078,956 A | 5/1937 | Lysholm |
| 2,168,313 A | 8/1939 | Bichowsky |
| 2,218,281 A | 10/1940 | Ridder |
| 2,359,108 A | 9/1944 | Hoskins |

(Continued)

FOREIGN PATENT DOCUMENTS

| | | |
|---|---|---|
| DE | 2111602 | 7/1983 |
| EP | 0546501 | 6/1993 |
| EP | 06318464 | 11/1994 |
| EP | 0634562 | 1/1995 |
| EP | 2001015134 | 1/2001 |
| EP | 2001085036 | 3/2001 |
| GB | 6394 | of 1898 |
| GB | 140516 | 3/1920 |
| GB | 271706 | 5/1927 |
| WO | WO 91/02886 | 3/1991 |
| WO | WO 94/10427 | 5/1994 |
| WO | WO 96/07024 | 3/1996 |
| WO | WO 97/44574 | 11/1997 |
| WO | WO 99/22127 | 5/1999 |
| WO | WO 99/63210 | 12/1999 |
| WO | WO 01/75277 | 10/2001 |

OTHER PUBLICATIONS

Reinkenhof. J. et al.; Steam Generation with Modified H2/02—Rocket Engines; unknown date.

(Continued)

*Primary Examiner*—Louis J. Casaregola
(74) *Attorney, Agent, or Firm*—Heisler & Associates

(57) ABSTRACT

A low or no pollution power generation system is provided. The system has an air separator to collect oxygen. A gas generator is provided with inputs for the oxygen and a hydrocarbon fuel. The fuel and oxygen are combusted within the gas generator, forming water and carbon dioxide. Water or other diluents are also delivered into the gas generator to control temperature of the combustion products. The combustion products are then expanded through at least one turbine or other expander to deliver output power. The combustion products are then passed through a separator where the steam is condensed. A portion of the water is discharged and the remainder is routed back to the gas generator as diluent. The carbon dioxide can be conditioned for sequestration. The system can be optimized by adding multiple expanders, reheaters and water diluent preheaters, and by preheating air for an ion transfer membrane oxygen separation.

8 Claims, 22 Drawing Sheets

U.S. PATENT DOCUMENTS

| | | |
|---|---|---|
| 2,368,827 A | 2/1945 | Hanson |
| 2,374,710 A | 5/1945 | Smith |
| 2,417,835 A | 3/1947 | Moore |
| 2,428,136 A | 9/1947 | Barr |
| 2,469,238 A | 5/1949 | Newton |
| 2,476,031 A | 7/1949 | Farkas |
| 2,478,682 A | 8/1949 | Blackwood |
| 2,487,435 A | 11/1949 | Goddard |
| 2,523,656 A | 9/1950 | Goddard |
| 2,547,093 A | 4/1951 | Ray |
| 2,563,028 A | 8/1951 | Goddard |
| 2,568,787 A | 9/1951 | Bosch |
| 2,582,938 A | 1/1952 | Eastman |
| 2,605,610 A | 8/1952 | Hermitte |
| 2,621,475 A | 12/1952 | Loy |
| 2,636,345 A | 4/1953 | Zoller |
| 2,654,217 A | 10/1953 | Rettaliata |
| 2,656,677 A | 10/1953 | Peterson |
| 2,662,373 A | 12/1953 | Sherry |
| 2,678,531 A | 5/1954 | Miller |
| 2,678,532 A | 5/1954 | Miller |
| 2,697,482 A | 12/1954 | Blizard |
| 2,717,491 A | 9/1955 | Barr |
| 2,722,100 A | 11/1955 | Goddard |
| 2,763,987 A | 9/1956 | Kretschmer |
| 2,770,097 A | 11/1956 | Walker |
| 2,832,194 A | 4/1958 | Kuhner |
| 2,869,324 A | 1/1959 | Foote |
| 2,884,912 A | 5/1959 | Lewis |
| 2,916,877 A | 12/1959 | Walter |
| 2,986,882 A | 6/1961 | Pavlecka |
| 3,038,308 A | 6/1962 | Fuller |
| 3,054,257 A | 9/1962 | Schelp |
| 3,101,592 A | 8/1963 | Robertson |
| 3,134,228 A | 5/1964 | Wolansky |
| 3,183,864 A | 5/1965 | Stengel |
| 3,238,719 A | 3/1966 | Harslem |
| 3,298,176 A | 1/1967 | Forsyth |
| 3,302,596 A | 2/1967 | Zinn |
| 3,315,467 A | 4/1967 | DeWitt |
| 3,331,671 A | 7/1967 | Goodwin |
| 3,335,565 A | 8/1967 | Aguet |
| 3,359,723 A | 12/1967 | Bohensky |
| 3,385,381 A | 5/1968 | Calaman |
| 3,423,028 A | 1/1969 | Stupakis |
| 3,459,953 A | 8/1969 | Hughes |
| 3,559,402 A | 2/1971 | Stone |
| 3,574,507 A | 4/1971 | Kydd |
| 3,608,529 A | 9/1971 | Smith |
| 3,649,469 A | 3/1972 | MacBeth |
| 3,657,879 A | 4/1972 | Ewbank |
| 3,677,239 A | 7/1972 | Elkins |
| 3,693,347 A | 9/1972 | Kydd |
| 3,702,110 A | 11/1972 | Hoffman |
| 3,703,807 A | 11/1972 | Rice |
| 3,731,485 A | 5/1973 | Rudolph |
| 3,736,745 A | 6/1973 | Karig |
| 3,738,792 A | 6/1973 | Feng |
| 3,747,336 A | 7/1973 | Dibelius |
| 3,751,906 A | 8/1973 | Leas |
| 3,772,881 A | 11/1973 | Lange |
| 3,779,212 A | 12/1973 | Wagner |
| 3,792,690 A | 2/1974 | Cooper |
| 3,804,579 A | 4/1974 | Wilhelm |
| 3,807,373 A | 4/1974 | Chen |
| 3,826,080 A | 7/1974 | DeCorso |
| 3,831,373 A | 8/1974 | Flynt |
| 3,850,569 A | 11/1974 | Alquist |
| 3,854,283 A | 12/1974 | Stirling |
| 3,862,624 A | 1/1975 | Underwood |
| 3,862,819 A | 1/1975 | Wentworth |
| 3,928,961 A | 12/1975 | Pfefferle |
| 3,972,180 A | 8/1976 | Van Gelder |
| 3,978,661 A | 9/1976 | Cheng |
| 3,980,064 A | 9/1976 | Ariga |
| 3,982,878 A | 9/1976 | Yamane |
| 4,063,414 A | 12/1977 | Sata |
| 4,118,925 A | 10/1978 | Sperry |
| 4,133,171 A | 1/1979 | Earnest |
| 4,148,185 A | 4/1979 | Somers |
| 4,193,259 A | 3/1980 | Muenger |
| 4,194,890 A | 3/1980 | McCombs |
| 4,199,327 A | 4/1980 | Hempill |
| 4,224,299 A | 9/1980 | Barber |
| 4,224,991 A | 9/1980 | Sowa |
| 4,249,371 A | 2/1981 | Romeyke |
| 4,271,664 A | 6/1981 | Earnest |
| 4,273,743 A | 6/1981 | Barber |
| 4,297,841 A | 11/1981 | Cheng |
| 4,313,300 A | 2/1982 | Wilkes |
| 4,327,547 A | 5/1982 | Hughes |
| 4,377,067 A | 3/1983 | Sternfeld |
| 4,425,755 A | 1/1984 | Hughes |
| 4,426,842 A | 1/1984 | Collet |
| 4,434,613 A | 3/1984 | Stahl |
| 4,456,069 A | 6/1984 | Vigneri |
| 4,465,023 A | 8/1984 | Wagner |
| 4,498,289 A * | 2/1985 | Osgerby .................... 60/39.52 |
| 4,499,721 A | 2/1985 | Cheng |
| 4,509,324 A | 4/1985 | Urbach |
| 4,519,769 A | 5/1985 | Tanaka |
| 4,528,811 A | 7/1985 | Stahl |
| 4,533,314 A | 8/1985 | Herberling |
| 4,549,397 A | 10/1985 | Cheng |
| 4,622,007 A | 11/1986 | Gitman |
| 4,631,914 A | 12/1986 | Hines |
| 4,657,009 A | 4/1987 | Zen |
| 4,674,463 A | 6/1987 | Duckworth |
| 4,680,927 A | 7/1987 | Cheng |
| 4,716,737 A | 1/1988 | Mandrin |
| 4,731,989 A | 3/1988 | Furuya |
| 4,765,143 A | 8/1988 | Crawford |
| 4,825,650 A | 5/1989 | Hosford |
| 4,841,721 A | 6/1989 | Patton |
| 4,845,940 A | 7/1989 | Beer |
| 4,884,529 A | 12/1989 | Byrnes |
| 4,899,537 A | 2/1990 | Cheng |
| 4,910,008 A | 3/1990 | Prudhon |
| 4,916,904 A | 4/1990 | Ramsaier |
| 4,928,478 A | 5/1990 | Maslak |
| 4,942,734 A | 7/1990 | Markbreiter |
| 4,948,055 A | 8/1990 | Belcher |
| 4,982,568 A | 1/1991 | Kalina |
| 4,987,735 A | 1/1991 | DeLong |
| 5,050,375 A | 9/1991 | Dickinson |
| 5,055,030 A | 10/1991 | Schirmer |
| 5,069,031 A | 12/1991 | Shekleton |
| 5,088,450 A | 2/1992 | Sternfeld |
| 5,103,630 A | 4/1992 | Correa |
| 5,131,225 A | 7/1992 | Roettger |
| 5,175,994 A | 1/1993 | Fox |
| 5,175,995 A | 1/1993 | Pak |
| 5,247,791 A | 9/1993 | Pak |
| 5,265,410 A | 11/1993 | Hisatome |
| 5,285,628 A | 2/1994 | Korenberg |
| 5,304,356 A | 4/1994 | Iijima |
| 5,329,758 A | 7/1994 | Urbach |
| 5,353,589 A | 10/1994 | Althaus |
| 5,363,642 A | 11/1994 | Frutschi |
| 5,364,611 A | 11/1994 | Iijima |
| 5,413,879 A | 5/1995 | Domeracki |

| | | |
|---|---|---|
| 5,417,053 A | 5/1995 | Uji |
| 5,449,568 A | 9/1995 | Micheli |
| RE35,061 E | 10/1995 | Correa |
| 5,473,899 A | 12/1995 | Viteri |
| 5,479,781 A | 1/1996 | Fric |
| 5,482,791 A | 1/1996 | Shingai |
| 5,490,377 A | 2/1996 | Janes |
| 5,491,969 A | 2/1996 | Cohn |
| 5,511,971 A | 4/1996 | Benz |
| 5,535,584 A | 7/1996 | Janes |
| 5,541,014 A | 7/1996 | Micheli |
| 5,557,936 A | 9/1996 | Drnevich |
| 5,572,861 A | 11/1996 | Shao |
| 5,581,997 A | 12/1996 | Janes |
| 5,590,518 A | 1/1997 | Janes |
| 5,590,528 A | 1/1997 | Viteri |
| 5,617,719 A | 4/1997 | Ginter |
| 5,628,184 A | 5/1997 | Santos |
| 5,636,980 A | 6/1997 | Young |
| 5,644,911 A | 7/1997 | Huber |
| 5,678,408 A | 10/1997 | Janes |
| 5,678,647 A | 10/1997 | Wolfe |
| 5,679,134 A | 10/1997 | Brugerolle |
| 5,680,764 A | 10/1997 | Viteri |
| 5,687,560 A | 11/1997 | Janes |
| 5,709,077 A | 1/1998 | Beichel |
| 5,715,673 A | 2/1998 | Beichel |
| 5,724,805 A | 3/1998 | Golomb |
| 5,761,896 A | 6/1998 | Dowdy |
| 5,802,840 A | 9/1998 | Wolf |
| 5,852,925 A | 12/1998 | Prasad |
| 5,906,806 A | 5/1999 | Clark |
| 5,955,039 A | 9/1999 | Dowdy |
| 5,956,937 A | 9/1999 | Beichel |
| 5,968,680 A | 10/1999 | Wolfe |
| 5,970,702 A | 10/1999 | Beichel |
| 5,997,595 A | 12/1999 | Yokohama |
| 6,170,264 B1 | 1/2001 | Viteri |
| 6,196,000 B1 | 3/2001 | Fassbender |
| 6,206,684 B1 | 3/2001 | Mueggenburg |
| 6,247,316 B1 | 6/2001 | Viteri |
| 6,260,348 B1 | 7/2001 | Sugishita |
| 6,269,624 B1 * | 8/2001 | Frutschi et al. ............ 60/39.52 |
| 6,389,814 B2 | 5/2002 | Viteri |
| 6,523,349 B2 | 2/2003 | Viteri |
| 6,598,398 B2 | 7/2003 | Viteri |
| 6,607,854 B1 | 8/2003 | Rehg |
| 6,622,470 B2 | 9/2003 | Viteri |
| 6,637,183 B2 * | 10/2003 | Viteri et al. ............... 60/39.52 |

OTHER PUBLICATIONS

Sternfeld, H.; A Hydrogenl Oxygen Steam Generator for the Peak–Load Management of Steam Power Plants; unkonwn date.

Brauser, S. et al.; A Proposed Hydrogen–Oxygen Power Cycle; 1967; Stillwater, Oklahoma.

Reese, R. et al.; A Proposed Hydrogen–Oxygen Fueled Steam Cycle for the Propulsion of Deep Submersibles; 1971; Massachusetts.

Lotker, M.; Hydrogen for the Electric Utilities—Long Range Possibilities; 1974; Hartford, Connecticut.

Lucci, A. et al.; Title Unknown (IECEC '75 Record); 1975; Canoga Park, California.

De Biasi, V.; A Look into Real Payoffs for Combined Cycle Conversions; Gas Turbine World; 1984; pp. 17, 18, 20, 22.

Pak, P. S. et al.; Closed Dual Fluid Gas Turbine Power Plant without Emission of C02 into the Atmosphere; IFAC/IF-ORS/IAEE Symposium; 1989; Pergamon Press; Tokyo, Japan.

Yantovskii, E. I.; The Thermodynamics of Fuel–Fired Power Plants without Exhaust Gases; Nov. 1991; Geneva.

Yantovskii, E. I.; Computer Exergonomics of Power Plants without Exhaust Gases; Energy Convers. Mgmt,; 1992; pp. 405–412; vol. 33, No, 5–8; Pergamon Press Ltd.; Great Britain.

Bolland, O. et al.; New Concepts for Natural Gas Fired Power Plants which Simplify the Recovery of Carbon Dioxide; Energy Convers. Mgmt.; 1992; pp. 467–475; 33, No. 5–8; Pergamon Press Ltd.; Great Britain.

Hendriks, C.A. et al. ; Carbon Dioxide Recovery Using A Dual Gas Turbine IGCC Plant; Energy Convers. Mgmt.; 1992; pp. 387–396; vol. 33, No. 5–8, Pergamon Press Ltd.; Great Britain.

Mercea, P. V. et al.; Oxygen Separation from Air by a Combined Pressure Swing Adsorption and Continuous Membrane Column Process; Journal of Membrane Science; 1994; pp. 131–144; Cincinnati, Ohio.

Bolland. O. et al.; Comparative Evaluation of Combined Cycles and Gas Turbine Systems with Water Injection, Steam Injection, and Recuperation; Transactions of the ASME; Jan. 1995; pp. 138–140, 142–145; vol. 117.

The NOx Report; Feb. 20, 1995; vol. 1, No. 1.

Alkam, M. K. et al.; Methanol and Hydrogen Oxidation Kinetics in Water at Supercritical States; 1995; The University of Iowa; Iowa City, Iowa.

Rice, I. G.; Stem–Injected Gas Turbine Analysis: Steam Rates; Journal of Engineering for Gas Turbines and Power; Apr. 1995; pp. 347–353; vol. 117.

Yantovskii, E. I.; A Zero Emission Combustion Power Plant for Enhanced Oil Recovery; Energy; 1995; vol. 20, No. 8; pp. 823–828.

Kolp, D. A. et al.; Advantages of Air Conditioning and Supercharging an LM6000 Gas Turbine Inlet; Journal of Engineering for Gas Turbines and Power; Jul. 1995; vol. 117.

EPA Proposes Across–the Board Phase II NOx Limitations; Air Pollution Regulatory Analysis Service; Jan. 19, 1996; Article No. 96–2.

Agazzani, A. et al.; An Assessment of the Performance of Closed Cycles with and without Heat Rejection at Cryogenic Temperatures; International Gas Turbine and Aeroengine Congress & Exhibition; Jun. 10–13, 1996; Birmingham, UK.

Facchini, B. et al.; Semi–Closed Gas Turbine/Combined Cycle with Water Recovery and Extensive Exhaust Gas Recirculation; International Gas Turbine and Aeroengine Congress & Exhibition; Jun 10–13, 1996; Birmingham, UK.

Nakhamkin, M. et al.; The Cascaded Humidified Advanced Turbine (CHAT); Journal of Engineering for Gas Turbines and Power; Jul. 1996; pp. 565–571; vol. 118.

Rice, I. G.; Split Stream Boilers for High–Temperature/ High–Pressure Topping Steam Turbine Combined Cycles; Journal of Engineering for Gas Turbines and Power; Apr. 1997; pp. 385–394; vol. 119.

Ulizar, I. et al.; A Semiclosed–Cycle Gas Turbine with Carbon Dioxide–Argon as Working Fluid; Journal of Engineering for Gas Turbines and Power; Jul. 1997; pp. 612–616; vol. 19.

Wilson, D. G. et al.; The Design of High–Efficiency Turbomachinery and Gas Turbines, Second Edition; 1998; pp. 146–161; Prentice Hall; Upper Saddle River, New Jersey.

Bannister, R. L. et al.; Development of a Hydrogen–Fueled Combustion Turbine Cycle for Power Generation; Transactions of the ASME; Apr. 1998; pp. 276–283; vol. 120.

Mathieu, P. et al.; Zero–Emission Matiant Cycle; Transactions of the ASME; Jan. 1999, pp. 116–120, vol. 121.

Norwegian Idea for CO2–Free Power Generation; Greenhouse Issues; Mar 1999.

Aker Maritime; Hi0x Gas Fired Power Plants without Atmospheric Emissions; Jun. 1999.

Turkenburg, W. C. et al.; Fossil Fuels in a Sustainable Energy Supply: The Significance of CO2 Removal; A Memorandum at the Request of the Ministry of Economic Affairs the Hague; Jun. 1999; pp. 1–26; Utrecht.

Bilger, R. W.; Zero Release Combustion Technologies and the Oxygen Economy; Fifth Int'l Conference on Technologies and Combustion for a Clean Environment; Jul. 1999; Lisbon, Portugal.

Bilger, R. W.; The Future for Energy from Combustion of Fossil Fuels; Fifth Int'l Conference on Technologies and Combustion for a Clean Environment; Jul. 1999; Lisbon, Portugal.

Herzog, H. et al.; Capturing Greenhouse Gases; Scientific American; Feb. 2000; pp. 72–79.

Anderson, R. E. et al.; A Unique Process for Production of Environmentally Clean Electric Power using Fossil Fuels; 8th International Symposium on Transport Phenomena an Dynamics of Rotating Machinery; Mar. 2000; pp. 1–6; Honolulu, Hawaii.

Chiesa, P. et al.; Natural Gas Fired COmbined Cycles with Low CO2 Emissions; Journal of Engineering for Gas Turbines and Power; Jul. 2000; pp. 429–436; vol. 122.

Hendriks, C.A. et al.; Costs of Carbon Dioxide Removal by Underground Storage; 5th International Conference on Greenhouse Gas Control Technologies (GHGT–5); Aug. 2000; Cairns, Australia.

Hustad, C. W.; Review Over Recent Norwegian Studies Regarding Cost of Low CO2–Emission Power Plant Technology; 5th International Conference on Greenhouse Gas Control Technology; Aug. 2000; Cairns, Australia.

* cited by examiner

CALCULATED HEATING VALUES AND FLOW RATES OF ONE TYPICAL SYN-GAS FROM A 300 TON/DAY MSW GASIFICATION SYSTEM

Wet Basis Composition, Flow Rates, and Heating Values [1]

| Component | Flow Rate | | | Concentration | | Heat of Combustion (LHV) | | Heat of Combustion (HHV) | |
|---|---|---|---|---|---|---|---|---|---|
| | $m^3/hr$ [2] | $kg \cdot mol/hr$ | $kg/hr$ | %vol | %wt | $kJ/kg \cdot mol$ | $kJ/hr$ | $kJ/m^3$(NTP) | $kJ/kg \cdot mol$ | $kJ/hr$ | $kJ/m^3$(NTP) |
| $H_2$ | 3463.6 | 141.567 | 285.38 | 57.338 | 7.657 | -241,826 | -34,234,736 | | -285,840 | -40,465,625 | |
| $CO_2$ | 1067.4 | 43.628 | 1920.05 | 17.670 | 51.516 | 0 | 0 | | 0 | 0 | |
| $CO$ | 995.2 | 40.677 | 1139.37 | 16.475 | 30.570 | -282,989 | -11,511,081 | | -282,989 | -11,511,081 | |
| $H_2O$ | 444.1 | 18.152 | 327.01 | 7.352 | 8.774 | 0 | 0 | | -44,014 | -798,920 | |
| $CH_4$ | 51.7 | 2.113 | 33.90 | 0.856 | 0.910 | -802,320 | -1,695,405 | | -890,347 | -1,881,418 | |
| $N_2$ | 18.3 | 0.748 | 20.95 | 0.303 | 0.562 | 0 | 0 | | 0 | 0 | |
| $C_2H_4$ | 0.4 | 0.016 | 0.46 | 0.007 | 0.012 | -1,322,960 | -21,629 | | -1,410,987 | -23,068 | |
| TOTAL | 6040.7 | 246.901 | 3727.12 | 100.00 | 100.00 | | -47,462,852 | -7,857.2 | | -54,680,113 | -9051.9 |
| | | | | | | | 13184.1kW | | | 15188.9kW | |

Dry Basis Composition, Flow Rates, and Heating Values [1]

| Component | Flow Rate | | | Concentration | | Heat of Combustion (LHV) | | Heat of Combustion (HHV) | |
|---|---|---|---|---|---|---|---|---|---|
| | $m^3/hr$ [2] | $kg \cdot mol/hr$ | $kg/hr$ | %vol | %wt | $kJ/kg \cdot mol$ | $kJ/hr$ | $kJ/m^3$(NTP) | $kJ/kg \cdot mol$ | $kJ/hr$ | $kJ/m^3$(NTP) |
| $H_2$ | 3463.6 | 141.567 | 285.38 | 61.888 | 8.393 | -241,826 | -34,234,736 | | -285,840 | -40,465,625 | |
| $CO_2$ | 1067.4 | 43.628 | 1920.05 | 19.072 | 56.470 | 0 | 0 | | 0 | 0 | |
| $CO$ | 995.2 | 40.677 | 1139.37 | 17.782 | 33.510 | -282,989 | -11,511,081 | | -282,989 | -11,511,081 | |
| $CH_4$ | 51.7 | 2.113 | 33.90 | 0.924 | 0.997 | -802,320 | -1,695,405 | | -890,347 | -1,881,418 | |
| $N_2$ | 18.3 | 0.748 | 20.95 | 0.327 | 0.616 | 0 | 0 | | 0 | 0 | |
| $C_2H_4$ | 0.4 | 0.016 | 0.46 | 0.007 | 0.013 | -1,322,960 | -21,629 | | -1,410,987 | -23,068 | |
| TOTAL | 5596.6 | 228.749 | 3400.11 | 100.00 | 100.00 | | -47462851.82 | -8480.7 | | -53881192.92 | -9627.5 |
| | | | | | | | 13184.1kW | | | 14967.0kW | |

[1] Heating values based upon assumption that all reactants and products enter and leave at 25°C and 1 atmosphere
[2] Normal temperature and pressure assumed to be 25°C and 1 atmosphere

*Fig. 21*

POWER PLANT OPERATION ON SYNGAS AND WITH ONE REHEATER
OPERATING PARAMETERS (SEE Fig. 19)

| POSITION | PRESSURE lb/in$^2$ | TEMPERATURE °F | FLOW RATE lb/sec. | POSITION | PRESSURE lb/in$^2$ | TEMPERATURE °F | FLOW RATE lb/sec. |
|---|---|---|---|---|---|---|---|
| A | 50 | 72 | 2.054 | AA | 2.1 | 192.9 | 10.51 |
| B | 105 | 228.5 | 2.054 | AB | 1550 | 151.7 | 6.674 |
| C | 100 | 84.77 | 2.054 | AC | 1630 | 109.7 | 6.674 |
| D | 210 | 244.5 | 2.054 | AD | 19.7 | 82.91 | 2.305 |
| E | 210 | 244.5 | 0.2283 | AE | 20.8 | 287.5 | 2.358 |
| F | 200 | 87.21 | 0.2283 | AF | 6.3 | 79.38 | 2.358 |
| G | 560 | 317.7 | 0.2283 | AG | 6.5 | 265.9 | 2.564 |
| H | 532 | 98.3 | 0.2283 | AH | 2.3 | 81.95 | 2.564 |
| I | 1480 | 245 | 0.2283 | AI | 2.4 | 141.1 | 3.716 |
| J | 30 | 72 | 1.783 | AJ | 2 | 127.5 | 10.51 |
| K | 78.8 | 291.9 | 1.783 | AK | 2 | 108.3 | 3.716 |
| L | 75 | 94.21 | 1.783 | AL | 19.7 | 82.91 | 0.053 |
| M | 210 | 399.4 | 1.783 | AM | 6.3 | 79.38 | 0.2066 |
| N | 210 | 339.4 | 0.1982 | AN | 2.3 | 81.95 | 1.152 |
| O | 200 | 101.6 | 0.1982 | AO | 2 | 81.76 | 1.437 |
| P | 560 | 349.7 | 0.1982 | AP | 2 | 108.3 | 6.795 |
| Q | 532 | 103.2 | 0.1982 | AQ | 2 | 108.3 | 6.674 |
| R | 1480 | 404.4 | 0.1982 | AR | 2100 | 287.1 | 2.279 |
| S | 170 | 1050 | 10.51 | AS | 644 | 85.07 | 2.279 |
| T | 210 | 339.4 | 1.585 | AT | 678 | 301.2 | 2.281 |
| U | 173 | 164.7 | 7.1 | AU | 210 | 94.03 | 2.281 |
| V | 182 | 592.5 | 7.1 | AV | 221 | 308.8 | 2.288 |
| W | 15 | 511.9 | 10.51 | AW | 63.2 | 89.01 | 2.288 |
| X | 210 | 244.5 | 1.826 | AX | 66.5 | 294.6 | 2.305 |
| Y | 1200 | 1050 | 7.1 | AY | 644 | 85.07 | 0.003 |
| Z | 1480 | 772.8 | 6.674 | AZ | 210 | 94.03 | 0.007 |
|  |  |  |  | BA | 63.2 | 89.01 | 0.01706 |

MISCELLANEOUS OPERATING PARAMETERS

INPUT POWER = 12705 [kW] LHV
ELECTRICAL POWER GENERATED = 5531 [kW]
PARASITIC POWER = 2074 [kW]
NET ELECTRICAL POWER = 3458 [kW]
LHV THERMAL EFFICIENCY = 0.2721

*Fig. 22*

POWER PLANT OPERATION ON SYNGAS AND WITH ONE REHEATER
OPERATING PARAMETERS (SEE Fig. 20)

| POSITION | PRESSURE lb/in$^2$ | TEMPERATURE °F | FLOW RATE lb/sec. | POSITION | PRESSURE lb/in$^2$ | TEMPERATURE °F | FLOW RATE lb/sec. |
|---|---|---|---|---|---|---|---|
| A | 50 | 72 | 2.054 | AA | 2.1 | 710.4 | 9.469 |
| B | 105 | 228.5 | 1.791 | AB | 14.5 | 1200 | 9.469 |
| C | 100 | 84.77 | 1.791 | AC | 15 | 1369 | 8.978 |
| D | 210 | 244.5 | 1.791 | AD | 1519 | 598 | 5.632 |
| E | 210 | 244.5 | 0.5339 | AE | 1480 | 727 | 5.632 |
| F | 200 | 87.21 | 0.5339 | AF | 14.55 | 513.3 | 8.978 |
| G | 560 | 317.7 | 0.5339 | AG | 1550 | 498.3 | 5.632 |
| H | 530 | 98.3 | 0.5339 | AH | 1630 | 108.1 | 5.632 |
| I | 1480 | 245 | 0.5339 | AI | 19.7 | 82.59 | 2.305 |
| J | 30 | 72 | 1.784 | AJ | 20.8 | 286.3 | 2.356 |
| K | 78.8 | 291.9 | 1.555 | AK | 6.3 | 78.5 | 2.356 |
| L | 75 | 94.21 | 1.555 | AL | 6.5 | 263.5 | 2.545 |
| M | 210 | 399.4 | 1.555 | AM | 2.3 | 80.29 | 2.545 |
| N | 210 | 339.4 | 0.4635 | AN | 2.4 | 139.3 | 3.557 |
| O | 200 | 101.6 | 0.4635 | AO | 2 | 126.9 | 9.469 |
| P | 560 | 349.7 | 0.4635 | AP | 2 | 106.6 | 3.557 |
| Q | 530 | 103.2 | 0.4635 | AQ | 19.7 | 82.59 | 0.051 |
| R | 1480 | 351.2 | 0.4635 | AR | 6.3 | 78.5 | 0.1897 |
| S | 20 | 72 | 0.2284 | AS | 2.3 | 80.29 | 1.011 |
| T | 170 | 2200 | 8.978 | AT | 2 | 80.31 | 1.277 |
| U | 210 | 339.4 | 1.092 | AU | 2 | 106.6 | 5.913 |
| V | 173 | 611 | 6.629 | AV | 2 | 106.6 | 5.632 |
| W | 182 | 953.4 | 6.629 | AW | 2100 | 287.1 | 2.279 |
| X | 1200 | 1500 | 6.629 | AX | 644 | 85.07 | 2.279 |
| Y | 210 | 244.5 | 1.257 | AY | 644 | 85.07 | 0.003 |
| Z | 20 | 72 | 0.263 | AZ | 678 | 301.1 | 2.282 |
| | | | | BA | 210 | 94.01 | 2.282 |
| | | | | BB | 210 | 94.01 | 0.007 |
| | | | | BC | 221 | 308.7 | 2.288 |
| | | | | BD | 63.2 | 88.92 | 2.288 |
| | | | | BE | 63.2 | 88.92 | 0.01681 |
| | | | | BF | 66.5 | 294.2 | 2.305 |

MISCELLANEOUS OPERATING PARAMETERS

INPUT POWER = 12707 [kW] LHV
ELECTRICAL POWER GENERATED = 7847 [kW]
PARASITIC POWER = 2132 [kW]
NET ELECTRICAL POWER = 5715 [kW]
LHV THERMAL EFFICIENCY = 0.4497

*Fig. 23*

LOW POLLUTION POWER GENERATION SYSTEM WITH ION TRANSFER MEMBRANE AIR SEPARATION

CROSS-REFERENCE TO RELATED APPLICATIONS

This application claims benefit under Title 35, United States Code §119(e) of U.S. Provisional Application Nos. 60/426,866, 60/426,941 and 60/426,942 filed on Nov. 15, 2002.

FIELD OF THE INVENTION

This invention contains environmentally clean engine designs that emit zero or very low pollutant levels during operation. The CLEAN AIR ENGINE (CLAIRE) invention is directly applicable to both transportation type vehicles including automobiles, trucks, trains, airplanes, ships and to stationary power generation applications. The designs feature hybrid, dual cycle and single cycle engines.

BACKGROUND OF THE INVENTION

The current art in generating power for transportation purposes basically utilize the internal combustion gas or diesel engine. The current art for electric power generation utilize gas turbines and/or steam turbines. These devices burn hydrocarbon fuels with air which contains (by weight) 23.1% oxygen, 75.6% nitrogen and the remaining 1.3% in other gases. The emissions resulting from the combustion of fuels for internal combustion engines (gasoline or diesel), with air contain the following pollutants that are considered damaging to our air environment. These smog causing pollutants, are: total organic gases (TOG); reactive organic gases (ROG); carbon monoxide (CO); oxides of nitrogen (NOx); oxides of sulfur (SOx); and particulate matter (PM). Approximately one half of the total pollutants emitted by all sources of air pollution in California are generated by road vehicles (Emission Inventory 1991, State of California Air Resources Board, prepared January 1994). The major source of this vehicle pollution comes from passenger cars and light to medium duty trucks.

No near term solutions appear in sight to drastically reduce the vast amount of air pollutants emitted by the many millions of automobiles and trucks operating today. Based on the State of California Air Resources Board study, the average discharge per person in California of the air pollutants from mobile vehicles, monitored by this agency during 1991 and reported in 1994, was approximately 1.50 lb/day per person. With a nationwide population of over 250,000,000 people, this data extrapolates to over 180,000 tons of air borne emissions per day being discharged in the USA by mobile vehicles. Also, the number of cars and miles that are being driven continue to increase, further hampering efforts to reduce smog causing pollutants.

Allowable emission thresholds are rapidly tightening by Federal and State mandates. These allowable emission reductions are placing severe demands on the transportation industry and the electric power generating industry to develop new and lower emission power systems.

Although considerable effort is being directed at improving the range of electric zero emission vehicles (ZEV) by developing higher energy capacity, lower cost storage batteries, the emission problem is been transferred from the vehicle to the electric power generating plant, which is also being Federally mandated (Clean Air Act Amendments of 1990) to reduce the same air toxic emissions as those specified for automobiles and trucks.

The current world wide art of generating power for consumers of electricity depends primarily on fossil fuel burning engines. These engines burn hydrocarbon fuels with air. As described above, combustion of fossil fuels with air usually produce combustion products that contain a number of pollutants. Current Unites States regulatory requirements prescribe the amounts of the atmospheric pollutants permitted in particular locations. Allowable pollutant thresholds are decreasing over time and thereby putting more and more pressure on industry to find better solutions to reduce these emissions of pollutants in the electric power generating industry and other power generating industries.

Other energy sources being developed to solve the emissions problem, by exploiting non combustible energy sources include fuel cells and solar cells. Developers are solving many of the technological and economic problems of these alternate sources. However, widespread use of these energy sources for vehicles and for electric power generating facilities do not appear to yet be practical.

SUMMARY OF THE INVENTION

This invention provides a means for developing a zero or very low pollution vehicle (ZPV) and other transportation power systems (i.e. rail and ship), as well as a zero or low pollution electric power generating facility. The zero or very low pollution is achieved by removing the harmful pollutants from the incoming fuel and oxidizer reactants prior to mixing and burning them in a gas generator or combustion chamber. Sulfur, sulfides and nitrogen are major pollutants that must be removed from the candidate fuels: hydrogen, methane, propane, purified natural gas, and light alcohols such as ethanol and methanol. Since air contains 76% nitrogen by weight, it becomes a major source of pollution that also requires removal prior to combining it with the clean fuel. Cleansing of the fuel is straightforward and requires no further elaboration. The separation of the oxygen from the nitrogen in the air, however, is accomplished in a variety of ways. For instance, nitrogen can be removed from air by the liquefaction of air and gradual separation of the two major constituents, oxygen and nitrogen, by means of a rectifier (to be described later in more detail). The separation of the gases relies on the two distinct boiling points for oxygen (162° R) and for nitrogen (139° R) at atmospheric pressure. Air liquefies at an intermediate temperature of (142° R).

Other nitrogen removal techniques include vapor pressure swing adsorption, and membrane based air separation. With vapor pressure swing adsorption, materials are used which are capable of adsorption and desorption of oxygen. With membrane based air separation, an air feed stream under pressure is passed over a membrane. The membrane allows one component of the air to pass more rapidly there through than other components, enriching the amount of different components on opposite sides of the membrane. Such membranes can be of a variety of different materials and use several different physical processes to achieve the desired separation of nitrogen out of the air.

One embodiment of this invention consists of a hybrid power system that combines a Rankine cycle thermal cycle with an auxiliary electric motor for start-up and chill-down requirements. The thermal power cycle of the engine begins by compressing ambient air to high pressures, cooling the air during compression and during the expansion to liquid air temperatures in a rectifier where separation of the oxygen and nitrogen takes place. The cold gaseous nitrogen generated is used to cool the incoming air and then is discharged to the atmosphere at near ambient temperature. Simultaneously, the cold gaseous or liquid oxygen generated by the rectifier is pressurized to gas generator pressure levels and delivered to the gas generator at near ambient temperature. Fuel, gaseous or liquid, from a supply tank is pressurized to the pressure level of the oxygen and also delivered to the gas generator where the two reactants are combined at substantially the stoichiometric mixture ratio to achieve complete combustion and maximum temperature hot gases (6500° R). These hot gases are then diluted with water downstream in a mixing section of the gas generator until the resulting temperature is lowered to acceptable turbine inlet temperatures (2000° R).

The drive gas generated from this mixing process consists of high purity steam, when using oxygen and hydrogen as the fuel, or a combination of high purity steam and carbon dioxide (CO2), when using oxygen and light hydrocarbon fuels (methane, propane, methanol, etc.). Following the expansion of the hot gas in the turbine, which powers the vehicle or the electric power generating plant, the steam or steam plus CO2 mixture are cooled in a condenser to near or below atmospheric pressure where the steam condenses into water, thus completing a Rankine cycle. Approximately 75% of the condensed water is recirculated to the gas generator while the remainder is used for cooling and discharged to the atmosphere as warm water vapor. When using light hydrocarbons as the fuel, the gaseous carbon dioxide remaining in the condenser is compressed to slightly above atmospheric pressure and either converted to a solid or liquid state for periodic removal, or the gas can be discharged into the atmosphere when such discharge is considered non-harmful to the local air environment.

Since this thermal cycle requires time to cool the liquefaction equipment to steady state low temperatures, an electric motor, driven by an auxiliary battery, can be used to power the vehicle and initiate the Rankine cycle until chill-down of the liquefaction equipment is achieved. When chill-down is complete the thermal Rankine engine, connected to an alternator, is used to power the vehicle or stationary power plant and recharge the auxiliary battery.

The combination of these two power systems, also referred to as a hybrid vehicle, emit zero or very low pollution in either mode of operation. In addition, the electric motor battery is charged by the zero or very low pollution thermal Rankine cycle engine itself and thus does not require a separate electric power generating plant for recharge. This reduces the power demand from central power stations and also reduces a potential source of toxic air emissions.

In place of the electric drive motor and battery, the Rankine cycle engine, with the addition of a few control valves, can also be operated as a minimally polluting open Brayton cycle, burning fuel and incoming air to power the vehicle during the period necessary to allow the Rankine cycle engine liquefaction equipment time to chill-down. This feature is another embodiment of this invention.

The zero or very low pollution Rankine cycle engine can also be used in a single cycle thermal mode for vehicles with long duration continuous duty such as heavy trucks, trains, ships and for stationary power generation plants where the chill-down time is not critical to the overall operational cycle.

The adaptation of the Otto and Diesel thermal cycles to a low-polluting hybrid engine are also included as embodiments of this invention. By using these thermal cycles, the need for a condenser and recirculating water system are eliminated. Low temperature steam or steam/carbon dioxide gases are recirculated as the working fluid and therefore replace the function of the recirculating water quench of the Rankine cycle embodiments previously discussed.

OBJECTS OF THE INVENTION

Accordingly, a primary object of the present invention is to provide a low or zero pollution combustion based power generation system. Such a system can be used in transportation and stationary power environments. Many countries' governments regulate the amount of pollution which can be generated by power generation system. This invention addresses the need for reduced pollution combustion based power generation systems.

Another object of this invention is to provide a high efficiency combustion based power generation system.

Another object of the present invention is to provide a power generation system which can also produce water as a byproduct. In areas where water is scarce the water byproducts produced by this invention are particularly beneficial.

Another object of the present invention is to provide a combustion based power generation system which includes an air treatment plant for separating nitrogen from the air prior to use of the air to combust a hydrocarbon fuel, such that nitrogen oxides are reduced or eliminated as byproducts of combustion in the power generation system.

Other further objects of the present invention will become apparent from a careful reading of the included drawing figures, the claims and detailed description of the invention.

BRIEF DESCRIPTION OF THE DRAWINGS

FIG. 21 is a table indicating the constitution of the syngas hydrocarbon fuel utilized in the power plants depicted in FIGS. 19 and 20.

FIG. 22 is a table of operating parameters at various different positions within the power generation system depicted in FIG. 19.

FIG. 23 is a table of operating parameters at various different positions within the power generation system depicted in FIG. 20.

DESCRIPTION OF THE PREFERRED EMBODIMENT

Figure 1:
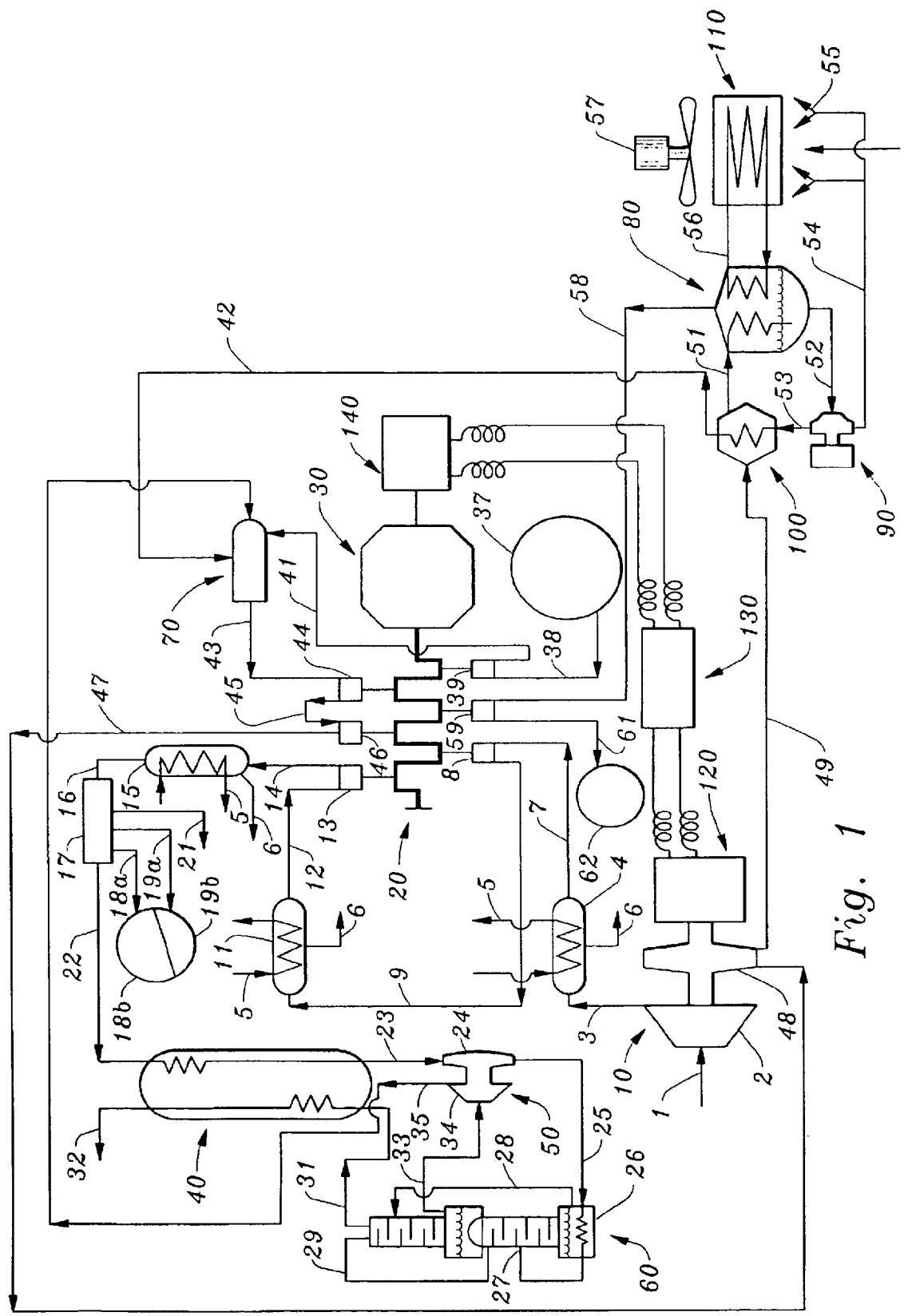
FIG. 1 is a schematic illustrating an embodiment of this invention and its elements, along with their connectivity. This embodiment constitutes a very low pollution or pollution-free hybrid power system for vehicular and other applications. The fuel reactant is a light hydrocarbon type such as methane propane, purified natural gas, and alcohols (i.e. methanol, ethanol).

According to the first embodiment of the present invention, a zero or very low pollution Rankine cycle thermal engine operating in parallel with a zero emissions electric motor (also referred to as a hybrid engine) is illustrated in FIG. 1. The Rankine engine consists of a dynamic turbocompressor 10, a reciprocating engine 20, a power transmission 30, a heat exchanger 40, a turboexpander 50, a rectifier 60, a gas generator 70, a condenser 80, a recirculating water feed pump 90, a water heater 100 and a condenser coolant radiator 110. The electric engine consists of an alternator 120, a battery 130 and electric motor 140.

Hybrid engine operation begins by starting the electric motor 140 using the battery 130 as the energy source. The electric motor 140 drives the reciprocating engine 20 through the power transmission 30 and thereby initiates the start of the thermal engine that requires a chill-down period for the liquefaction equipment consisting of heat exchanger 40, turboexpander 50 and rectifier 60.

Activation of the thermal engine initiates the compression of ambient temperature air from a surrounding environment entering the dynamic compressor 2 through an air inlet duct 1. The compressor 2 raises the air to the design discharge pressure. The air then exits through duct 3 into intercooler 4 where the heat of compression is removed by external cooling means 5 (i.e. air, water, Freon, etc.). Condensed water vapor from the air is tapped-off by drain 6. After the air exits intercooler 4 through duct 7, at a temperature equal to the compressor inlet, it enters the reciprocating compressor 8 and is raised to the design discharge pressure. The air exits through duct 9 into intercooler 11 and is again cooled to the inlet temperature of the compressor. This compression/cooling cycle is repeated as the air exits intercooler 11 through duct 12 and enters reciprocating compressor 13, then exits through duct 14, enters intercooler 15 and exits through duct 16, to complete the air pressurization.

The high pressure, ambient temperature air then enters the scrubber 17 where any gases or fluids that could freeze during the subsequent liquefaction are removed. These gases and liquids include carbon dioxide (duct 18$a$ and storage tank 18$b$), oil (line 19$a$ and storage tank 19$b$) and water vapor (tap off drain 21). The oil can be from a variety of sources, such as leakage from the air compression machinery. The dry air then exits through duct 22 and enters heat exchanger 40 where the air is cooled by returning low temperature gaseous nitrogen.

The dry air is now ready to pass through an air treatment device for the separation of nitrogen out of the air and to provide nitrogen free oxygen for combustion as discussed below. The dry air will contain, by weight, 23.1% oxygen, 75.6% nitrogen, 1.285% argon and small traces of hydrogen, helium, neon, krypton and xenon (total of 0.0013%). Argon has a liquefaction temperature of 157.5° R, which lies between the nitrogen and oxygen boiling points of 139.9° R and 162.4° R respectively. Therefore argon, which is not removed, will liquefy during the liquefaction process. The remaining traces of gases hydrogen, helium and neon are incondensable at temperatures above 49° R while krypton and xenon will liquefy; however, the trace amounts of these latter gases is considered insignificant to the following air liquefaction process.

The dry air then exits through duct 23 and enters the turboexpander 24 where the air temperature is further reduced to near liquid air temperature prior to exiting duct 25 and enters the rectifier 60 (a two column type design is shown). Within the rectifier, if not before, the air is cooled to below the oxygen liquefaction temperature. Preferably, a two column type rectifier 60 is utilized such as that described in detail in the work: *The Physical Principles of Gas Liquefaction and Low Temperature Rectification*, Davies, first (published by Longmans, Green and Co. 1949).

The air exits from the lower rectifier heat exchanger 26 through duct 27 at liquid air temperature and enters the rectifier's lower column plates where the oxygen/nitrogen separation is initiated. Liquid with about 40% oxygen exits through duct 28 and enters the upper rectifier column where a higher percentage oxygen concentration is generated. Liquid nitrogen at 96% purity is recirculated from the lower rectifier column to the upper column by means of duct 29. Gaseous nitrogen at 99% purity (1% argon) exits through duct 31 and enters heat exchanger 40 where cooling of the incoming air is performed prior to discharging through duct 32 to the atmosphere at near ambient temperature and pressure. Gaseous or liquid oxygen at 95% purity (5% argon) exits through duct 33 and enters the turboexpander compressor 34 where the oxygen is pressurized to the design pressure. The high pressure oxygen then exits through duct 35 and enters the gas generator 70.

A light hydrocarbon fuel (methane, propane, purified natural gas and light alcohols such as ethanol and methanol) exits the fuel supply tank 37 through duct 38 and enters the reciprocating engine cylinder 39 where the fuel is raised to the design discharge pressure. The fuel then exits through duct 41 and enters the gas generator 70 to be mixed with the incoming oxygen at the stoichiometric mixture ratio to achieve complete combustion and maximum hot gas temperature (approximately 6500° R). The gas generator includes an ignition device, such as a spark plug, to initiate combustion. While the gas generator 70 is the preferred form of fuel combustion device for this embodiment, other fuel combustion devices could also be used, such as those discussed in the alternative embodiments below. The products of combustion of these reactants result in a high purity steam and carbon dioxide gas and a small amount of gaseous argon (4%).

Following the complete combustion of the high temperature gases, recirculating water is injected into the gas generator 70 through line 42 and dilutes the high temperature gases to a lower temperature drive gas acceptable to the reciprocating engine (approximately 2000° R). This water influx also increases a mass flow rate of combustion products available for expansion and power generation. The drive gas then exits the gas generator 70 through discharge duct 43, enters reciprocating cylinder 44, expands and provides power to the power transmission 30. Other combustion product expansion devices can replace the reciprocating cylinder 44, such as the dynamic turbines discussed in the sixth embodiment below. The gas exits through duct 45, enters the second cylinder 46, expands and also provides power to the power transmission; the gas exits through duct 47 and powers the dynamic turbine 48 which drives the centrifugal compressor 2, which was driven by the electric motor 140 during start-up, and the alternator 120 to recharge the battery 130.

The gas then exits through duct 49, enters the water heater 100 where residual heat in the gas is transferred to the recirculating water being pumped by pump 90, the water heater gas exits through duct 51, enters the condenser 80 at near or below atmospheric pressure, where condensation of the steam into water and separation of the carbon dioxide takes place. The condensed water exits through line 52, enters the pump 90 where the pressure of the water is raised to the gas generator 70 supply pressure level. A major portion of the pump 90 discharge water exits through line 53, enters the water heater 100 where heat is transferred from the turbine 48 exhaust gas and then exits through line 42 for delivery to the gas generator 70. The remaining water from the discharge of pump 90 exits through duct 54 and is sprayed through nozzles 55 into radiator 110 (evaporative cooling). Coolant for the condenser gases is recirculated through duct 56 to the radiator 110 where heat is rejected to atmospheric air being pumped by fan 57.

The gaseous carbon dioxide, remaining after the condensation of the steam, exits the condenser 80 through duct 58 and enters the reciprocating cylinder 59, (when the condenser pressure is below atmospheric) compressed to slightly above atmospheric pressure and discharged through duct 61. The compressed carbon dioxide can be stored in storage tank 62 and converted to a solid or liquid state for periodic removal; or the gas can be discharged into the atmosphere when such expulsion is permitted.

It should be noted that this hybrid engine generates its own water requirements upon demand and thus eliminates the freezing problem of a steam Rankine cycle in a cold (below freezing) environment. Also, the engine generates its oxidizer requirements on demand and thus eliminates many safety concerns regarding oxygen storage.

Figure 2:
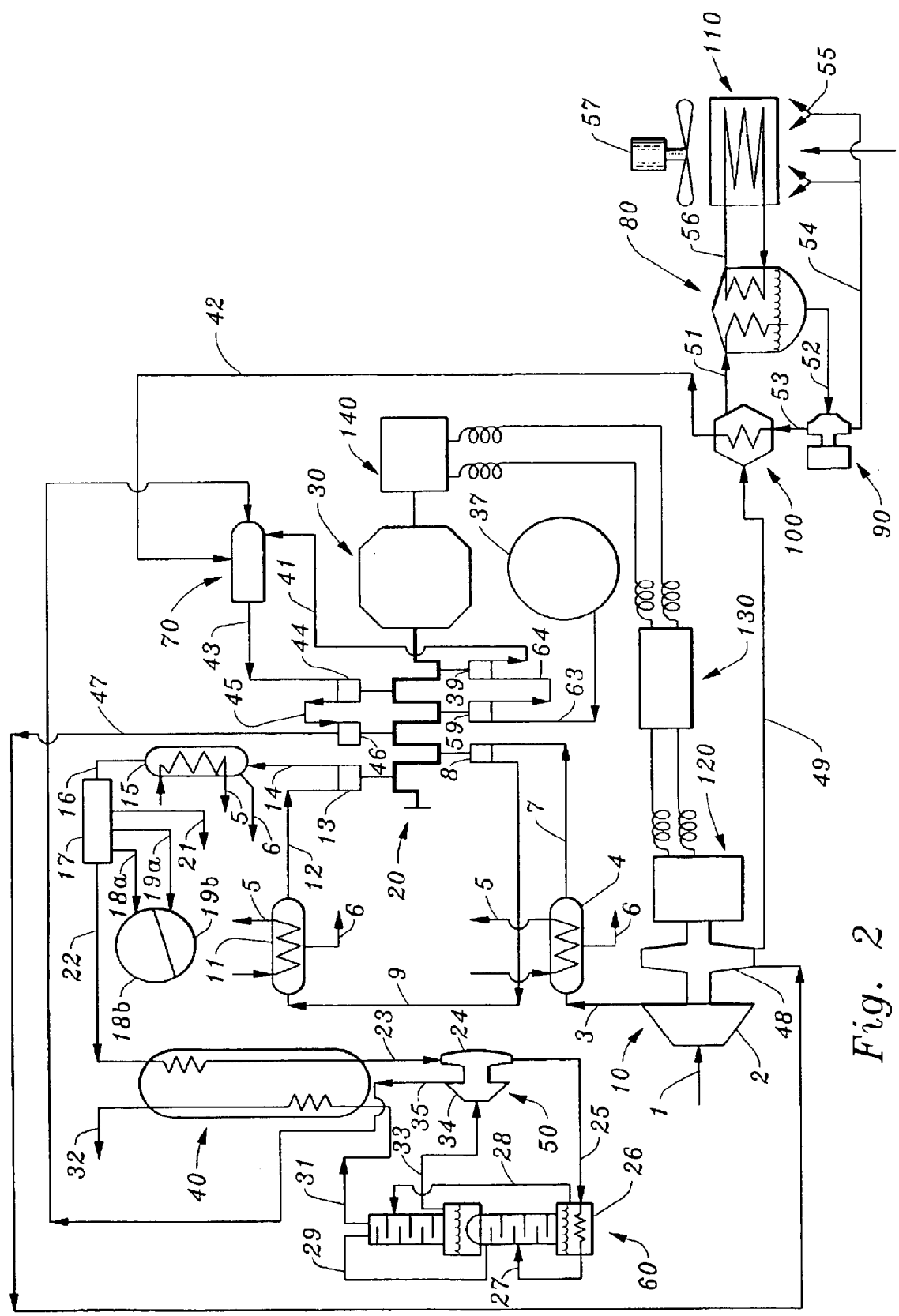
FIG. 2 is a schematic illustrating an embodiment of this invention which is also a very low pollution or pollution-free hybrid power system for vehicular and other applications where the fuel is gaseous hydrogen.

A second embodiment of this invention, illustrated in FIG. 2, features a hybrid engine when using hydrogen in place of a hydrocarbon fuel. When using hydrogen as the fuel no carbon dioxide is generated and only high purity steam exits from the gas generator 70. Consequently all systems related to carbon dioxide are deleted, and no other changes are basically required. However, to maintain the same six cylinder engine of FIG. 1, the hydrogen fuel FIG. 2 exits the fuel supply tank 37 through duct 63, enters reciprocating engine cylinder 59, exits through duct 64, enters reciprocating engine cylinder 39, exits through duct 41 and is delivered to the gas generator 70. This permits two stages of compression for the low density hydrogen.

Figure 3:
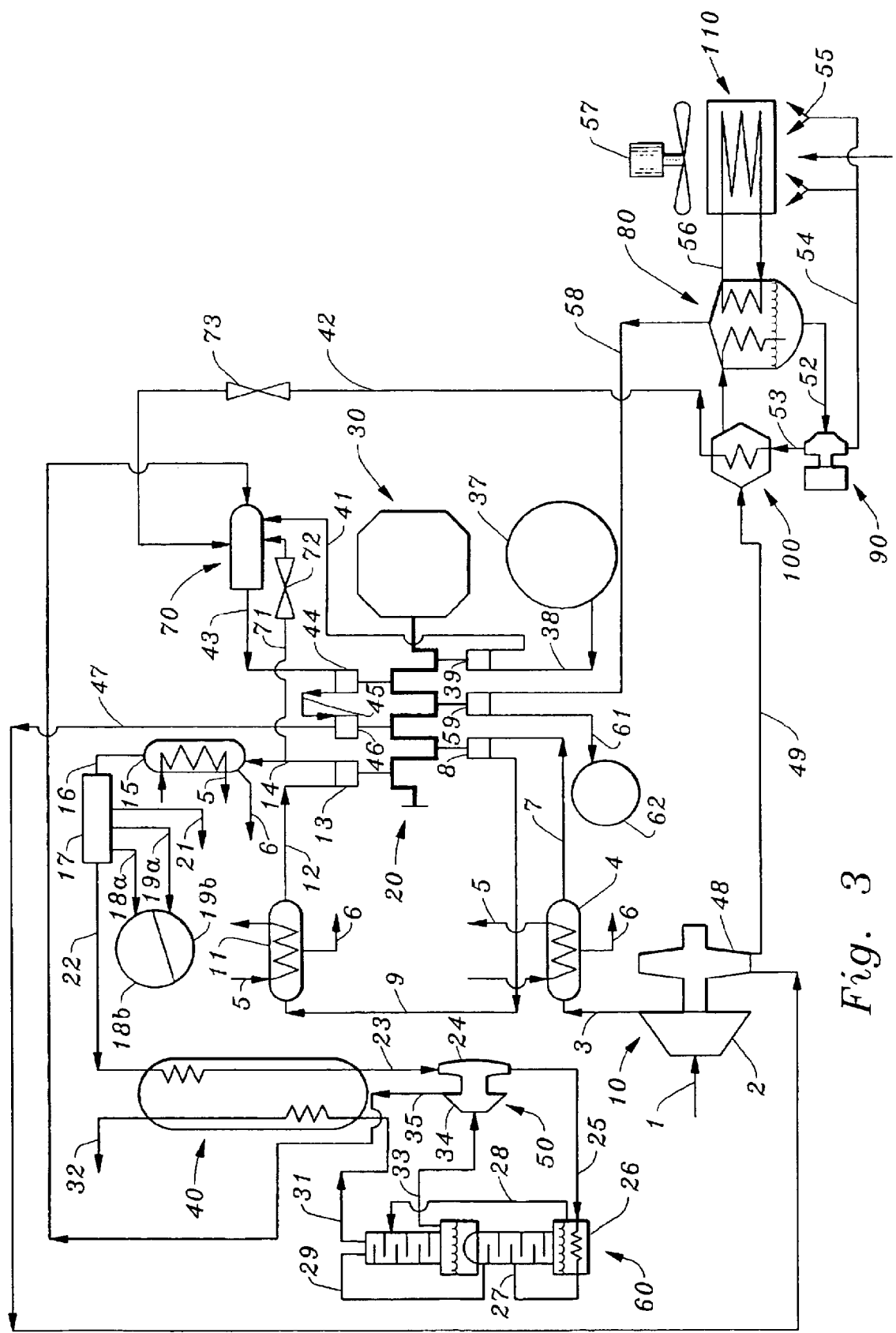
FIG. 3 is a schematic illustrating an embodiment of this invention which is a very low pollution or pollution-free power system for vehicular and other applications during cruise and continuous duty. During start-up and a short period thereafter, the engine runs in an open Brayton cycle mode and thus emits some pollutants.

A third embodiment of this invention, illustrated in FIG. 3, features a dual cycle engine where a Brayton cycle is used for start-up and chill-down of the air liquefaction equipment (Mode I) and a Rankine cycle is used for cruise, idle and continuous duty (Mode II). To incorporate this feature, high pressure air is tapped-off from cylinder 13 (air pressurization as previously described for embodiment one) by means of bypass air duct 71 and modulated by valve 72. Also, recirculating water to the gas generator is modulated by means of valve 73 to control the combustion temperature of the fuel and oxygen and the exit temperature of the gaseous mixture being delivered to power the cycle through duct 43.

Figure 5:
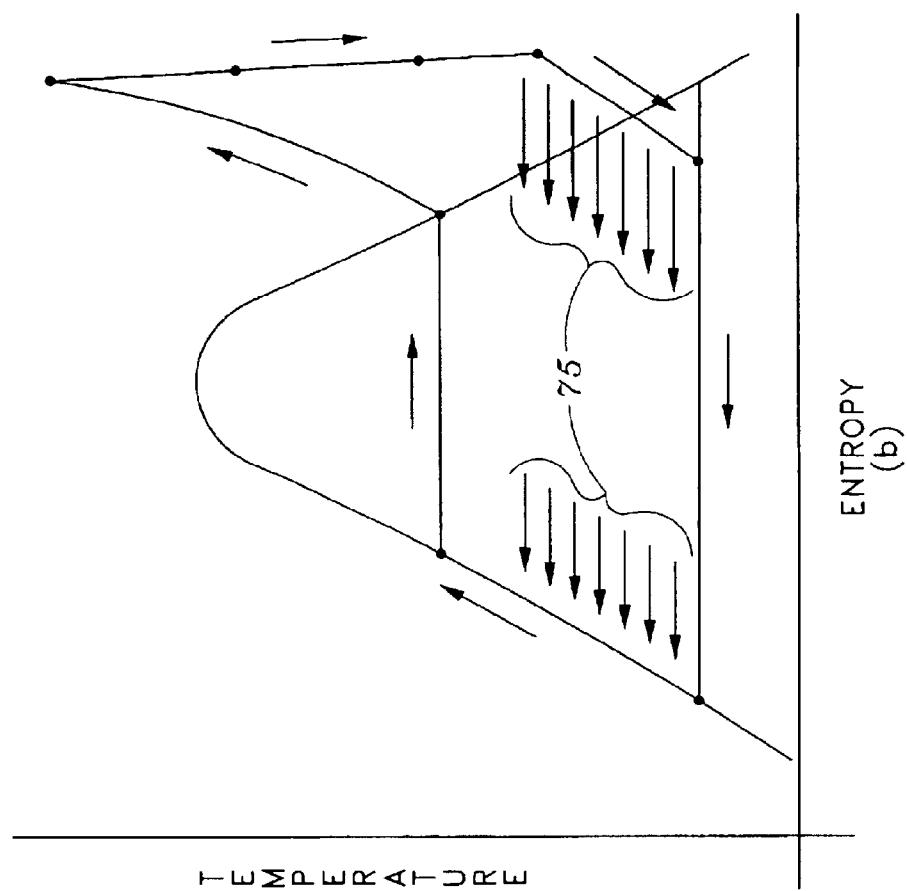
FIG. 5 is a plot of Temperature v. Entropy for the working fluid illustrating the second cycle used in the dual mode engine of FIG. 3. This cycle is a Rankine with regeneration, (Mode II).
Figure 4:
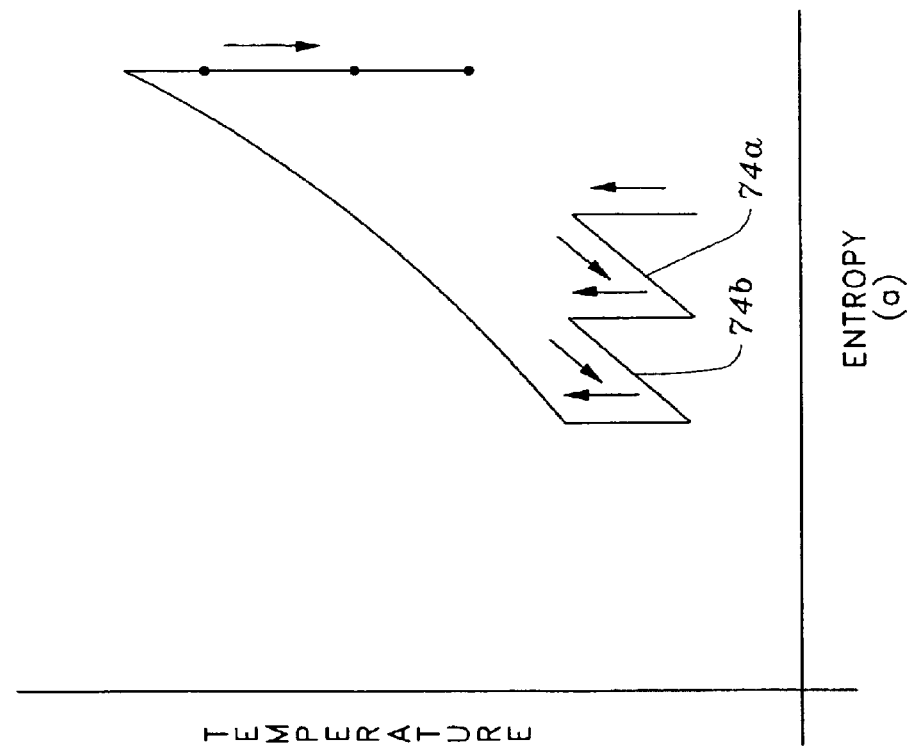
FIG. 4 is a plot of Temperature v. Entropy for the working fluid illustrating the first of two cycles used in the dual mode engine of FIG. 3. This cycle is an open Brayton with inter-cooling between compressor stages (Mode I).

The thermodynamic cycles for these two operating Modes are illustrated in FIG. 4 and FIG. 5. The working fluid for power cycle operation in Mode I consists of steam, carbon dioxide and gaseous air. When operating in Mode II the working fluid (as discussed in embodiment one and two) consists of steam and carbon dioxide when using hydrocarbon fuel and steam only when using hydrogen.

An open Brayton cycle, illustrated in FIG. 4, with two stages of intercooling the compressed air, 74a, and 74b, is used to power the engine during Mode I and initiates the chill-down of the liquefaction equipment for subsequent Mode II operation of the Rankine cycle with regeneration 75, illustrated in FIG. 5. Note that this embodiment eliminates the need for an electric motor, battery and alternator.

Figure 6:
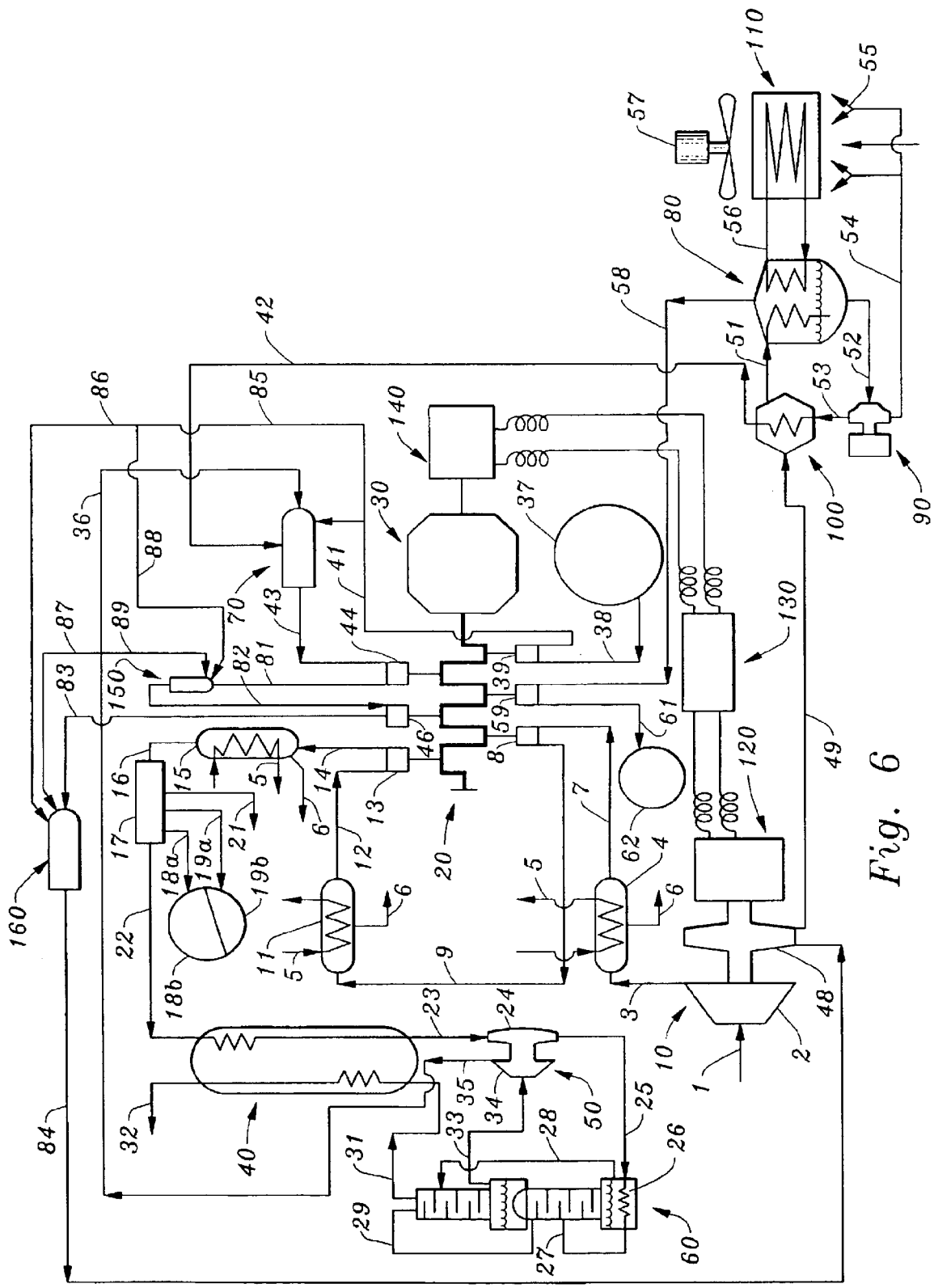
FIG. 6 is a schematic illustrating an embodiment of this invention and its interconnecting elements. This embodiment constitutes a very low pollution or pollution-free hybrid power system for vehicular and other applications similar to that of FIG. 1 but with the addition of two reheaters to the power cycle for improved performance. The fuel reactant for this cycle is a light hydrocarbon.

A fourth embodiment of this invention, illustrated in FIG. 6, includes all the elements of the first embodiment and adds two reheaters 150 and 160 to improve the performance of this engine. While two reheaters 150, 160 are shown, any number of reheaters can be utilized depending on the requirements of each specific application.

The engine operates as described for the first embodiment but with the following changes. Hot gases exiting reciprocating cylinder 44 exit through duct 81, enter the reheater 150 where additional light hydrocarbon fuel and oxygen is injected through ducts 88 and 89 respectively. The heat of combustion of these reactants within the reheater 150 raises the incoming gas temperature to the level of the gas generator 70 output. The reheated gas then exits reheater 150 through duct 82, enters reciprocating cylinder 46, expands and exits through duct 83 and enters reheater 160 where additional oxygen and fuel is injected. The heat of combustion of these reactants within the reheater 160 again raises the incoming gas temperature to the same level as at the gas generator 70 output. The heated gas then exits through duct 84 and enters the dynamic turbine 48, as described previously in the first embodiment. Fuel for the reheater 160 is supplied through duct 86. The oxygen is supplied through duct 87.

Figure 7:
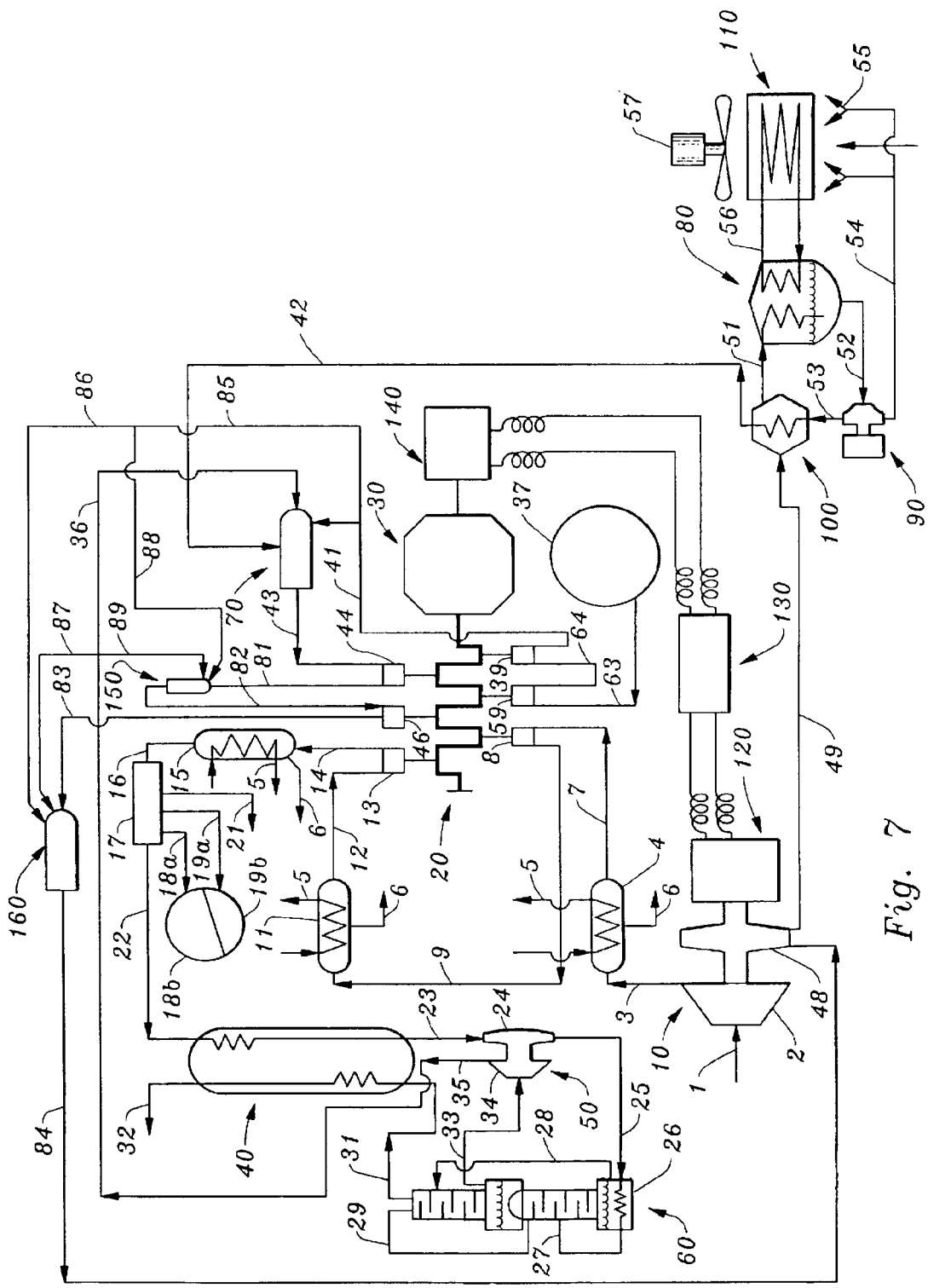
FIG. 7 is a schematic illustrating an embodiment of this invention and its interconnecting elements. This embodiment constitutes a very low pollution or pollution-free hybrid power system similar to that of FIG. 2 but with the addition of two reheaters to the power cycles for improved performance. The fuel reactant for this cycle is hydrogen.
Figure 8:
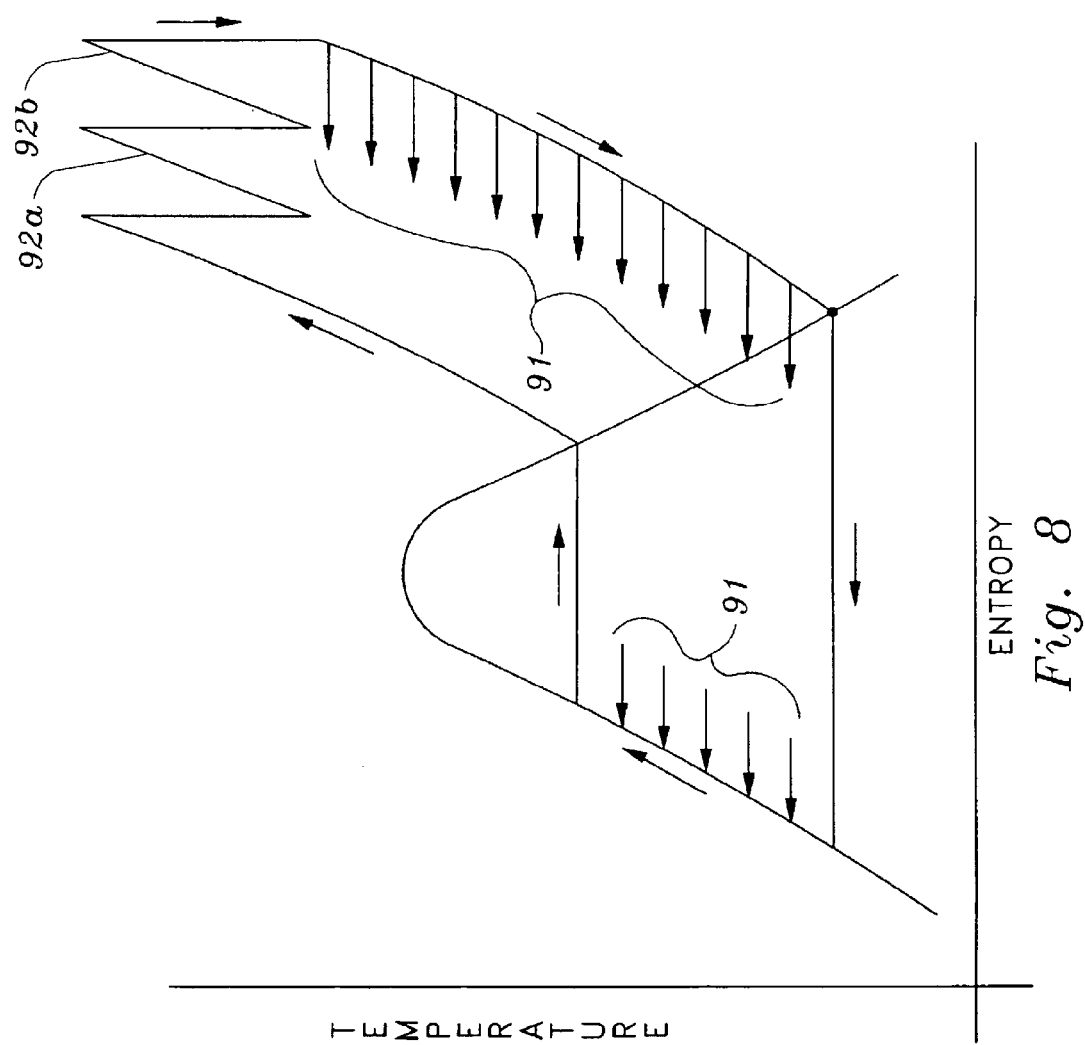
FIG. 8 is a plot of Temperature v. Entropy for the working fluid for the power cycle used for the thermal engines shown in FIG. 6 and FIG. 7. This cycle features the Rankine cycle with regeneration and reheat for improved performance.

A fifth embodiment of this invention, illustrated in FIG. 7, includes all the elements of the second embodiment and adds two reheaters 150 and 160 to improve the performance. This engine operates as described for embodiment four except this engine uses hydrogen fuel. The Rankine cycle of these embodiments using regeneration and reheats is illustrated in FIG. 8. Regeneration is illustrated by 91 and the two reheats are illustrated by 92a and 92b.

Figure 9:
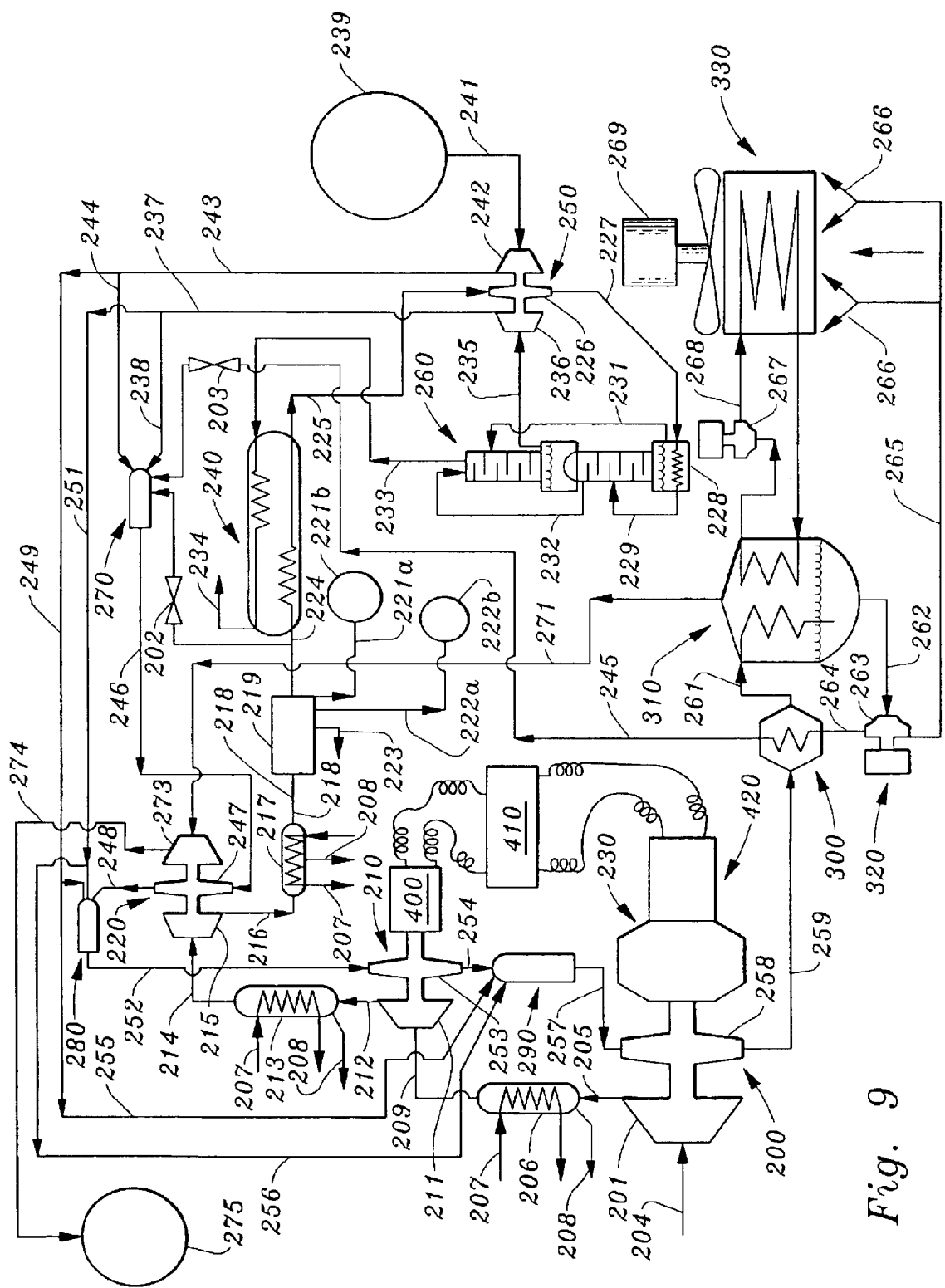
FIG. 9 is a schematic illustrating an embodiment of this invention that features a very low pollution or non-polluting hybrid engine with electric motor drive and a Rankine power cycle utilizing dynamic type turbomachinery. The Rankine power cycle utilizes regeneration and reheaters for increased cycle efficiency and power density.

A sixth embodiment of this invention; illustrated in FIG. 9, is similar to the fourth embodiment featuring reheaters, illustrated in FIG. 6, except all the machinery consists of dynamic type compressors and turbines. This type of machinery is more suitable for higher power levels (>1000 Shaft Horsepower (SHP)) required for rail, ship or standby power systems.

The Rankine engine consists of dynamic turbocompressors 200, 210, and 220, a power transmission 230, a heat exchanger 240, a turboexpander 250, a rectifier 260, a gas generator 270, a first reheater 280, a second reheater 290, a water heater 300, a condenser 310, a recirculating pump 320 and a condenser coolant radiator 330. The electric engine consists of an alternator 400, a battery 410 and electric motor 420.

Engine operation begins by starting the electric motor 420 using the battery 410 as the energy source. The electric motor 420 drives the dynamic compressor 201 through power transmission 230, and simultaneously, valve 202 is opened and valve 203 is closed. This initiates the start of the engine in a Brayton cycle mode. As engine speed increases valve 202 is gradually closed and valve 203 is gradually opened to slowly transition into the Rankine cycle mode and permit the liquefaction equipment to chill down. During this transitional period the electric motor 420 is used to maintain scheduled power and speed until steady state Rankine cycle conditions are achieved.

During thermal engine activation air enters turbocompressor 201 through duct 204 and is raised to the design discharge pressure. The air then exits through duct 205 into intercooler 206 where the heat of compression is removed by external cooling means 207 (i.e. air, water, Freon, etc.). Condensed water vapor is tapped-off by drain 208. After the air exits intercooler 206 through duct 209 at a temperature equal to the compressor inlet, it enters compressor 211 and is raised to the design discharge pressure. The air then exits through duct 212 into intercooler 213 and is again cooled to the inlet temperature of the compressor 201. This compression/cooling cycle is repeated as the air exits intercooler 213 through duct 214, enters compressor 215, then exits through duct 216, enters intercooler 217 and exits through duct 218 to complete the air pressurization.

The high pressure ambient temperature air then enters scrubber 219 where gases and fluids that are subject to freezing during the liquefaction process are removed (i.e. carbon dioxide, water vapor and oil). Carbon dioxide exits through duct 221a and is processed and stored in reservoir 221b. Oil is drained through duct 222a and stored in reservoir 222b. Water vapor is drained through duct 223 and discharged overboard. The dry air then exits through duct 224 and enters the heat exchanger 240 where the air is cooled by returning gaseous nitrogen. It then exits through duct 225 and enters turboexpander 226 where the air temperature is further reduced to near liquid air temperature prior to exiting through duct 227 and enters the rectifier 260. The air exits from the rectifier heat exchanger 228 through duct 229 at liquid air temperature and enters the rectifier's lower column plates where oxygen/nitrogen separation is initiated. Liquid with 40% oxygen exits through duct 231 and enters the upper rectifier column where a higher percentage oxygen concentration is generated. Liquid nitrogen at 96% purity is recirculated from the lower rectifier column to the upper column by means of duct 232. Gaseous nitrogen at 99% purity (1% argon) exits through duct 233 and enters the heat exchanger 240 where cooling the incoming dry air is performed prior to discharging through duct 234 to the atmosphere at near ambient temperature and pressure. Gaseous oxygen or liquid oxygen at 95% purity (5% argon) exits through duct 235 and enters the turboexpander compressor 236 where the oxygen is pressurized to the design pressure. The high pressure oxygen then exits through duct 237 and enters the gas generator 270 through duct 238.

Fuel, i.e. methane, propane, purified natural gas and light alcohols such as methanol and ethanol, exits the fuel supply tank 239 through duct 241 and enters the compressor 242 of turboexpander 250 and is raised to the design discharge pressure. The pressurized fuel then exits through duct 243 and enters the gas generator 270 through duct 244 where it mixes with the incoming oxygen at stoichiometric mixture ratio to achieve complete combustion and maximum hot gas temperature (approximately 6500° R). The products of combustion of these reactants result in a high purity steam, carbon dioxide gas and a small amount of gaseous argon (4%).

Following complete combustion of the high temperature gases, recirculating water is injected into the gas generator through line 245 and dilutes the high temperature gases to a lower temperature drive gas acceptable to the dynamic turbine 247 (approximately 2000° R). The drive gas then exits the gas generator 270 through duct 246 and enters the turbine 247 of turbocompressor 220, where the gas expands and powers the air compressor 215 and the carbon dioxide compressor 273. The gas then exits through duct 248 and enters reheater 280 where the heat extracted due to the turbine 247 work is replenished. This heat is derived from the combustion of added fuel through duct 249 and added oxygen through duct 251 into reheater 280.

The reheated gas then exits through duct 252 and enters turbine 253 of turbocompressor 210 and expands to lower pressure. The power produced by these expanding gases drive the alternator 400 and compressor 211, then exhaust through duct 254 and enter reheater 290. The heat extracted from the gases resulting in the turbine work is replenished with the heat of combustion from added fuel through duct 255 and oxygen through duct 256.

The reheated gas then exits through duct 257, enters turbine 258 of turbocompressor 200 and drives compressor 201 and power transmission 230. The turbine exhaust gas then exits through duct 259 and enters water heater 300 where the residual heat of the turbine 258 exhaust is used to preheat the water that is being recirculated to the gas generator 270. The gas then exits through duct 261, enters the condenser 310 near or below atmospheric pressure, where condensation of the steam into water and separation of the carbon dioxide gas occurs.

The condensed water exits through line 262, enters the pump 263 where the pressure is raised to the supply level of the gas generator 270. A major portion of the discharge water from pump 263 exits through line 264, enters the water heater 300 where heat is absorbed from the turbine exhaust gas and then exists through line 245 for delivery to the gas generator 270. The remaining water from the discharge of pump 263 exits through line 265 and is sprayed through nozzles 266 into radiator 330 for evaporative cooling. Coolant for the condenser gas is recirculated by pump 267 to the radiator 330 through line 268, where heat is rejected to atmospheric air being pumped by fan 269.

The gaseous carbon dioxide, remaining from the condensation of steam, exits through duct 271 and enters compressor 273 of turbocompressor 220 and is compressed to slightly above atmospheric pressure (when condenser pressure is below atmospheric) and discharged through duct 274 into storage tank 275. The compressed carbon dioxide can be converted into a liquid or solid state for periodic removal, or the gas can be discharged into the atmosphere as local environmental laws permit.

Figure 10:
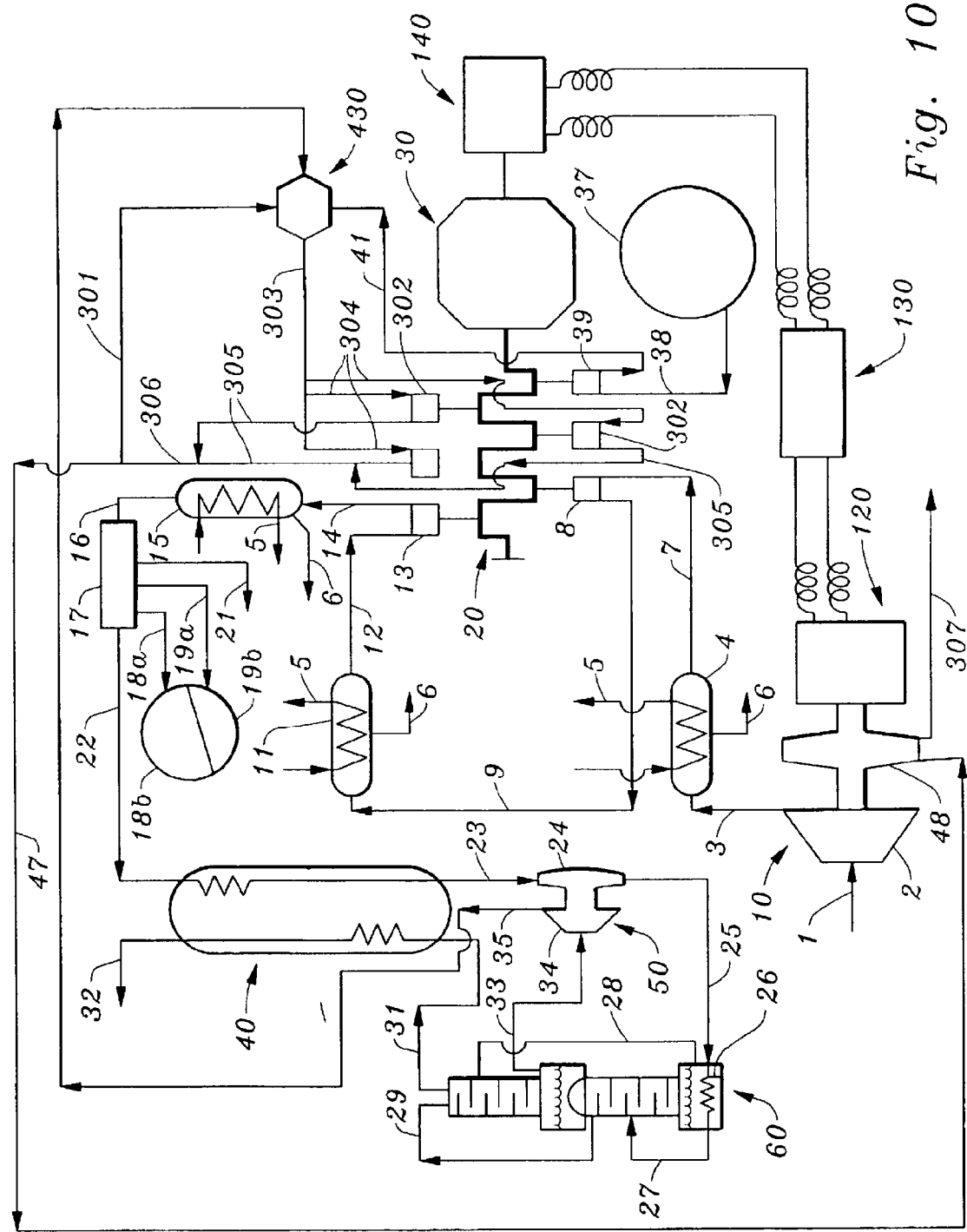
FIG. 10 is a schematic illustrating an embodiment of this invention that features a low polluting hybrid engine with an electric motor drive and an Otto power cycle reciprocating engine.

The seventh embodiment of this invention, illustrated in FIG. 10, includes the liquefaction system of the previous embodiments but utilizes the intermittent but spontaneous combustion process of the Otto cycle as the thermal power engine. This embodiment eliminates the need for the steam condenser and the recirculating water system.

The Otto cycle steam or steam/CO2 thermal engine consists of, in addition to the liquefaction system previously described, a premixer 430 where oxygen from duct 35, fuel from duct 41 and recirculating steam or steam/CO2 from duct 301 are premixed in the approximate ratio of 20%, 5% and 75% by weight respectively. These premixed gases are then directed to the reciprocating pistons 302 through duct 303 and ducts 304 where they are compressed and ignited with a spark ignition system identical to current Otto cycle engines. After the power stroke, the steam or steam/CO2 gases are discharged to the dynamic turbine 48 through ducts 305, 306 and then into duct 47. Some of the discharge gases are directed back to the premixer 430 through duct 301. The exhaust gases from the dynamic turbine 48 are then discharged to the atmosphere through duct 307.

Figure 11:
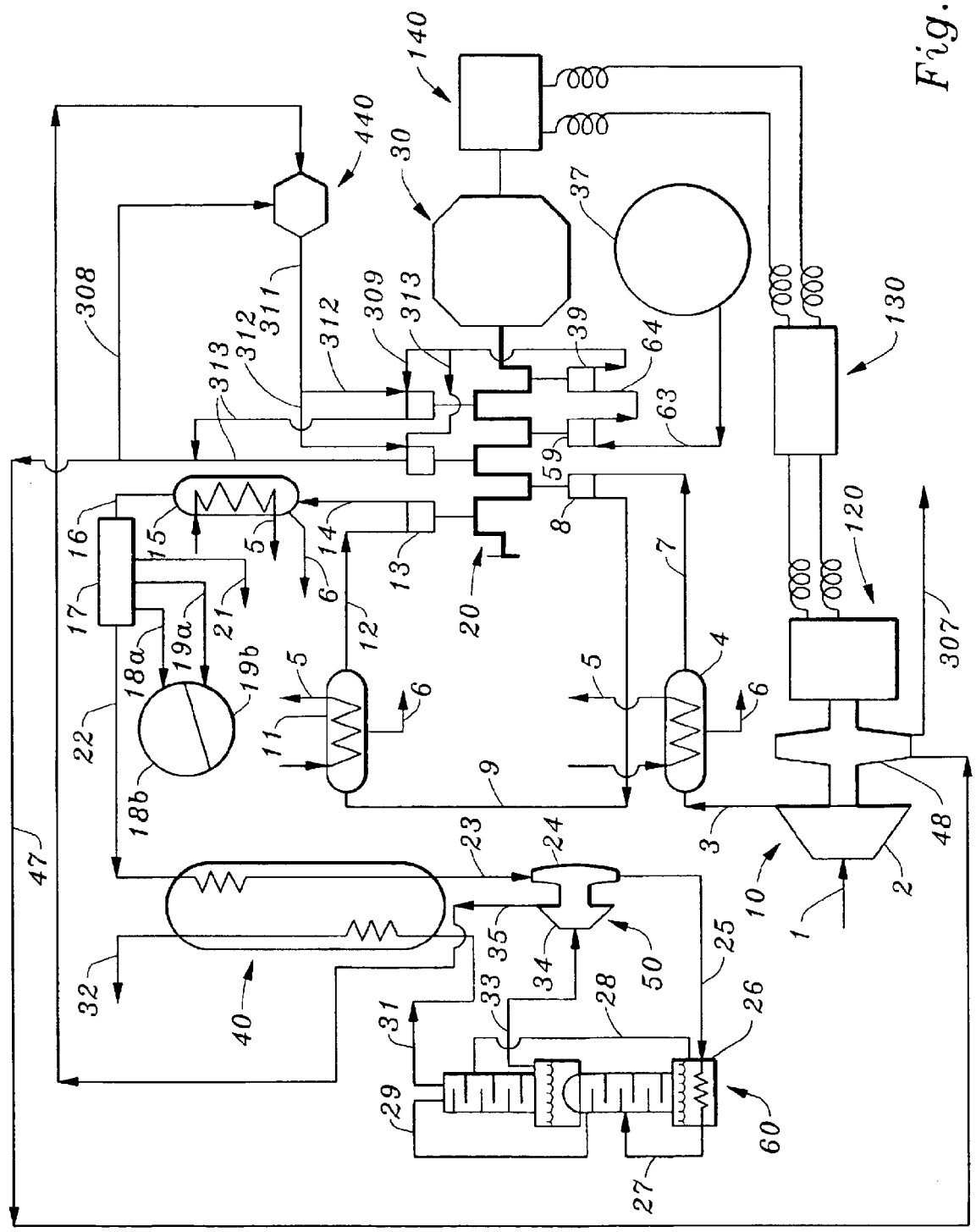
FIG. 11 is a schematic illustrating an embodiment of this invention that features a low polluting hybrid engine with an electric motor drive and a Diesel power cycle reciprocating engine.

The eighth embodiment of this invention, illustrated in FIG. 11, is similar to the seventh embodiment, except a Diesel power cycle is used. In this system a premixer 440 mixes the oxygen from duct 35 with steam or steam/CO2 from duct 308, at an approximate mixture ratio of 23% and 77% by weight respectively, and discharges the gaseous mixture to the reciprocating pistons 309 through duct 311 and ducts 312 where the mixture is compressed to a high pre-ignition temperature. The high pressure fuel, at approximately 5% of the total weight of the gas mixture in the piston cylinder, is injected through ducts 313 and burns at approximately constant pressure. If necessary, an ignition device is located within the combustion cylinder. The hot gases then rapidly expand as the piston moves to the bottom of its power stroke. The steam/CO2 gases are then discharged into ducts 313 and delivered to the dynamic turbine 48 through duct 47. Some of the discharged gases are diverted to the premixer 440 through the duct 308. The exhaust gases from the dynamic turbine 48 are then discharged into the atmosphere through duct 307.

Figure 12:
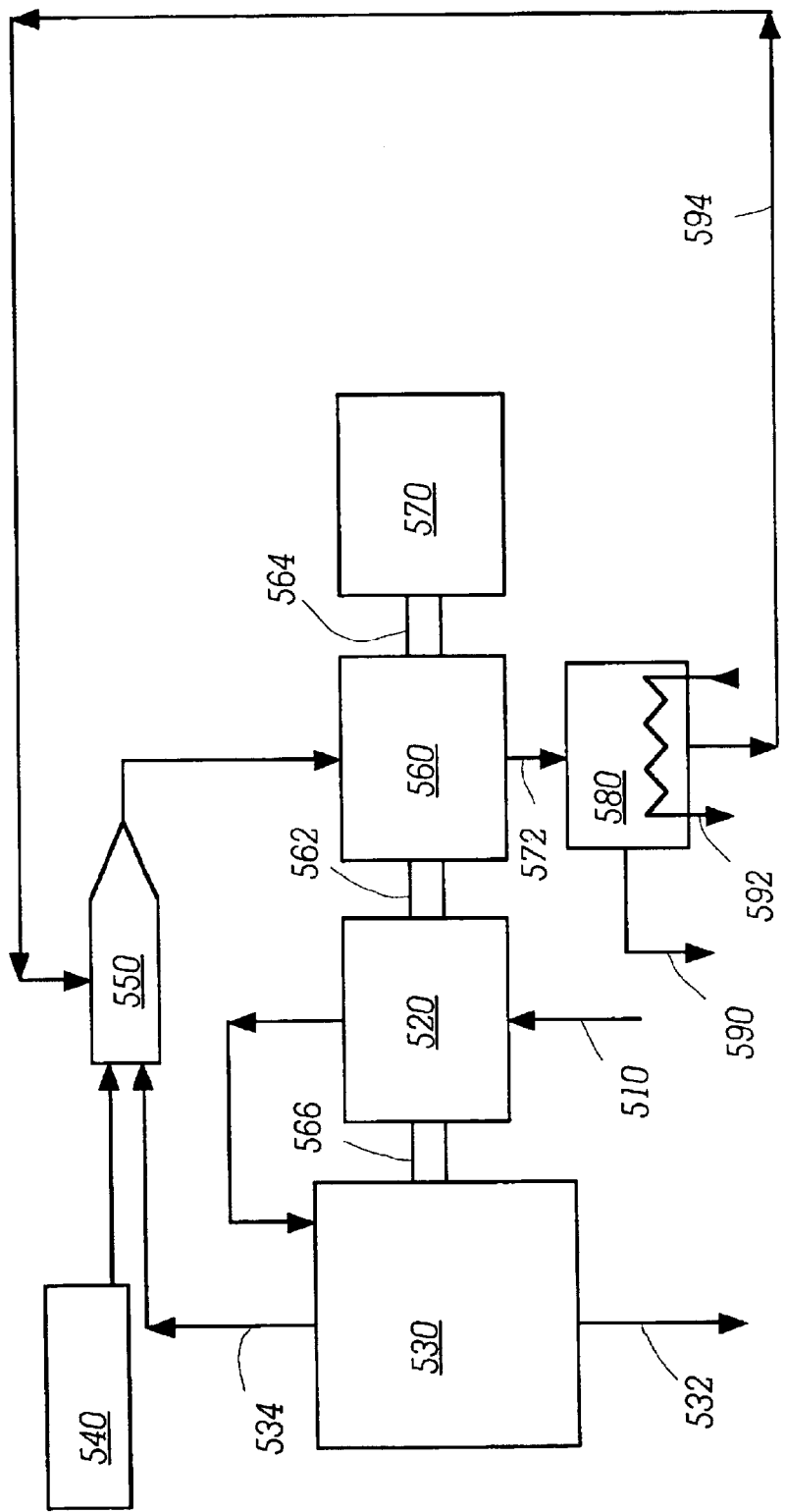
FIG. 12 is a schematic illustrating a basic low-polluting engine where a rectifier and air liquefaction devices of previous embodiments are replaced with an air separation plant which separates nitrogen from air by any of a variety of techniques including liquefaction, vapor pressure swing adsorption, membrane based air separation, etc.

FIG. 12 depicts a basic low-polluting engine 500 which conceptually represents many of the above-described first eight embodiments in a more simplified manner. Rather than identifying specific machinery, FIG. 12 depicts steps in the overall power production cycle. Additionally, the engine 500 of FIG. 12 replaces the rectifier and other liquefaction equipment of embodiments 1–8 with a more generalized air separation plant 530. Details of various different embodiments of this air separation plant 530 are provided in FIGS. 15 and 16 and described in detail herein below.

The basic low-polluting engine 500 operates in the following manner. Air from a surrounding environment enters through an air inlet 510 into an air compressor 520. The air compressor 520 elevates the air entering through the air inlet 510 and directs the compressed air to the air separation plant 530. Various different air separation techniques can be utilized by the air separation plant 530 so that enriched nitrogen gases exit the air separation plant 530 through an enriched nitrogen gas outlet 532 and enriched oxygen gases exit the air separation plant 530 through an enriched oxygen gases outlet 534. The enriched nitrogen gases outlet 532 typically returns back into the surrounding environment. The enriched oxygen gases outlet 534 leads to the combustion device 550.

In the combustion device 550, the enriched oxygen gases from the air separation plant 530 are combined with the hydrogen containing fuel from a fuel supply 540 and combustion is initiated within the combustion device 550. A water or carbon dioxide diluent is added into the combustion device to decrease a temperature of the products of combustion within the combustion device 550 and to increase a mass flow rate for a steam or steam and carbon dioxide working fluid exiting the combustion device 550.

This working fluid is then directed into an expander 560, such as a turbine. The turbine is coupled through a power transfer coupling 562 to the air compressor 520 to drive the air compressor 520. FIG. 12 shows a rotating shaft as one type of mechanical power transfer coupling 562. Another way to power the air compressor 520 is to generate electricity by means of the power absorber 570 and use part of the generated electricity to drive an electric motor which in turn powers the air compressor 520. The expander 560 also is coupled through a power transfer coupling 564 to a power absorber 570 such as an electric generator or a power transmission for a vehicle. The expander 560 is also coupled through a power transfer coupling 566 to the air separation plant 530 to drive machinery within the air separation plant 530.

The working fluid is then discharged from the expander 560 through a discharge 572. The discharge 572 leads to a condenser 580. The condenser has coolant passing through a coolant flow path 592 which causes water portions of the working fluid entering the condenser 580 to be condensed. A water and carbon dioxide outlet 590 is provided for excess water or water and carbon dioxide mixture from the condenser. A water or water and carbon dioxide diluent path is also provided out of the condenser 580 for returning water or water and carbon dioxide diluent back to the combustion device 550.

As should be readily apparent, the air compressor 520 is generally analogous to the turbocompressor 10 of the first embodiment. The air separation plant 530 is generally analogous to the rectifier 60 of the first embodiment. The fuel supply 540 is generally analogous to the fuel supply tank 37 of the first embodiment. The combustion device 550 is generally analogous to the gas generator 70 of the first embodiment. The expander 560 is generally analogous to the reciprocating cylinders 44, 46 of the reciprocating engine 20 of the first embodiment. The power absorber 570 is generally analogous to the power transmission 30 of the first embodiment and the condenser 580 is generally analogous to the condenser 80 of the first embodiment. Hence, the basic low-polluting engine schematic of FIG. 12 represented by reference numeral 500 merely provides an overall depiction of the power production cycle of this invention. While a specific analogy has been drawn between this basic low-polluting engine 500 and the first embodiment, shown in FIG. 1, similar analogies can be drawn to the other embodiments of this invention.

Figure 13:
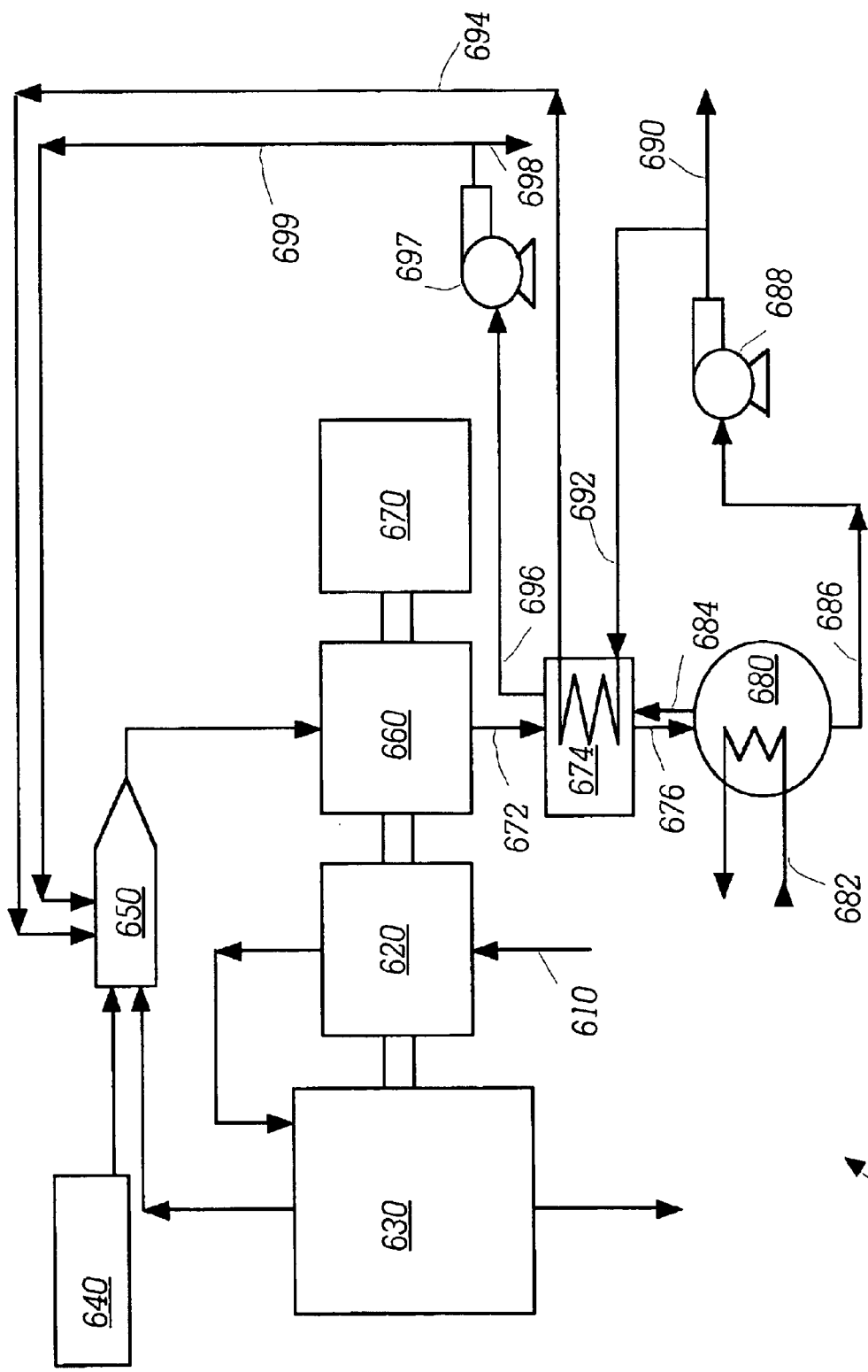
FIG. 13 is a schematic similar to that which is shown in FIG. 12 but including regeneration in the cycle disclosed therein.

With particular reference to FIG. 13, details of a basic low-polluting engine 600 featuring regeneration is provided. The low-polluting engine featuring regeneration 600 depicted in FIG. 13 is identical to the basic low-polluting engine 500 of FIG. 12 except that handling of the working fluid upon discharge from the expander 660 has been altered to feature regeneration. Specifically, the low-polluting engine featuring regeneration 600 includes an air inlet 610, air compressor 620, air separation plant 630, fuel supply 640, combustion device 650, expander 660 and power absorber 670 arranged similarly to the components 510, 520, 530, 540, 550, 560, 570 of the basic low-polluting engine 500 shown in FIG. 12.

In contrast, the low-polluting engine featuring regeneration 600 directs the working fluid through a discharge 672 which leads to a regenerator 674. The working fluid exits the regenerator 674 through a regenerator outlet 676. The regenerator outlet 676 leads to a condenser 680. Within the condenser 680, the working fluid is cooled by action of a coolant flowing along a coolant flow path 682 to be separated into carbon dioxide and water. The carbon dioxide exits the condenser 680 through a carbon dioxide outlet 684 and the water exits the condenser 680 through the water outlet 686. The water outlet 686 leads to a feed water pump 688. Excess water is discharged from the engine 600 at a water excess outlet 690. Other portions of the water are directed along a regenerator water flow path 692 through the regenerator 674 where the water is preheated. The water or steam leaves the regenerator 674 along a water diluent path 694 leading back to the combustion device 650.

The carbon dioxide outlet 684 from the condenser 680 also leads into the regenerator 674 for preheating of the carbon dioxide. The carbon dioxide leaves the regenerator along a regenerator carbon dioxide flow 696 which leads to a carbon dioxide compressor 697. The carbon dioxide compressor 697 in turn leads to a carbon dioxide excess outlet 698 where excess carbon dioxide is removed from the engine 600. If desired, a portion of the carbon dioxide can be directed along a carbon dioxide diluent path 699 back to the combustion device 650 for use as a diluent within the combustion device 650.

Figure 14:
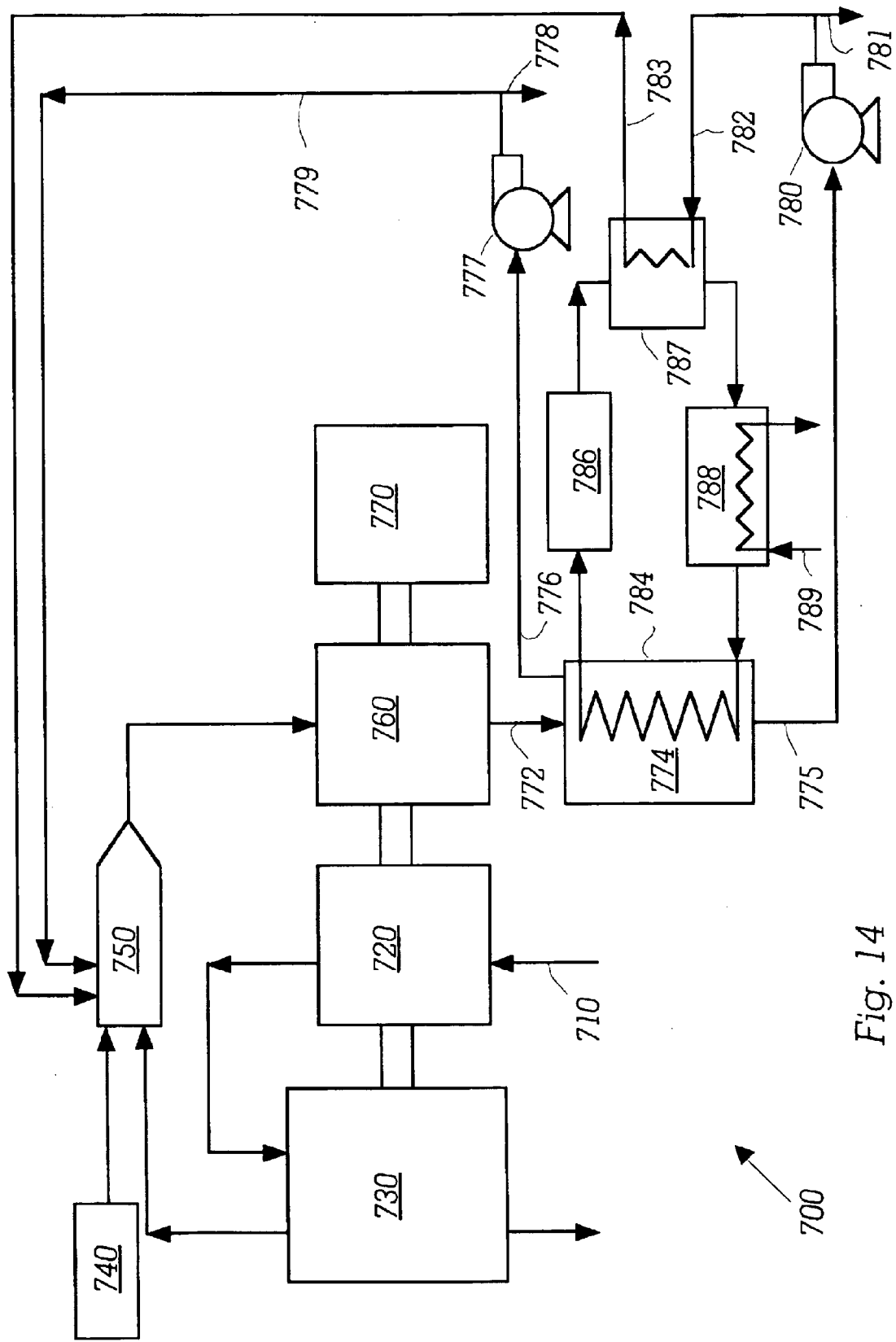
FIG. 14 is a schematic similar to that which is disclosed in FIGS. 12 and 13 except that a duel cycle arrangement is provided which features a bottoming cycle for enhanced efficiency.

With particular reference to FIG. 14, a basic low-polluting engine 700 with bottoming cycle is provided. As with the low-polluting engine featuring regeneration 600 of FIG. 13, portions of the low-polluting engine featuring a bottoming cycle 700 are similar to the basic low-polluting engine 500 of FIG. 12 up until discharge of the working fluid from the expander 560. Hence, the low polluting engine featuring a bottoming cycle 700 includes an air inlet 710, air compressor 720, air separation plant 730, fuel supply 740, combustion device 750, expander 760 and power absorber 770 having corresponding components in the engine 500 of FIG. 12.

The working fluid is discharged from the expander 760 through a discharge 772 leading to a Heat Recovery Steam Generator (HRSG)/condenser 774. The working fluid is condensed and a water outlet 775 directs water from the condenser 774 and a carbon dioxide outlet 776 directs carbon dioxide from the condenser 774. The carbon dioxide outlet 776 leads to a carbon dioxide compressor 777, a carbon dioxide excess outlet 778 and carbon dioxide diluent path 779 leading back to the combustion device 750.

The water outlet 775 leads to a feed water pump 780 which in turn leads to a water excess outlet 781 and a water regeneration path 782 where the water is regenerated within a bottoming regenerator 787. The water exits the bottoming regenerator 787 along a water diluent path 783 leading back to the combustion device 750.

The HRSG/condenser 774 and regenerator 787 are driven by a bottoming cycle including a bottoming cycle boiler 784 which boils water in the bottoming cycle from the discharge working fluid from the discharge 772 and entering the HRSG/condenser 774. The topping cycle also includes a bottoming turbine 786 and a bottoming regenerator 787 which cools steam exiting the steam turbine 786 and heats water entering the water diluent path 783. The bottoming cycle also includes a bottoming condenser 788 cooled by a coolant within a coolant line 789. Hence, the working fluid such as water within the bottoming cycle passes from the condenser 788 to the boiler 784 where the working fluid is heated and turned into a gas. Note that the HRSG/condenser 774 and boiler 784 are integrated together but that only heat exchange is allowed, not mixing. The bottoming cycle working fluid then passes through the turbine 786 for production of power which can be directed to the power absorber 770 or other components of the low-polluting engine featuring a bottoming cycle 700. The working fluid then exits the turbine 786 and is cooled in the regenerator 787 before returning to the condenser 788.

The air separation plants 530, 630, 730 of FIGS. 12–14 can be any of a variety of different apparatuses or systems which are capable of removing at least a portion of the nitrogen from air. For instance, and specifically discussed above with respect to the first through eighth embodiments of FIGS. 1–11, the air separation plant 530, 630, 730 can include a rectifier such as the rectifier 60 of FIG. 1 or other liquefaction equipment which separate nitrogen from the air by liquefaction.

Figure 15:
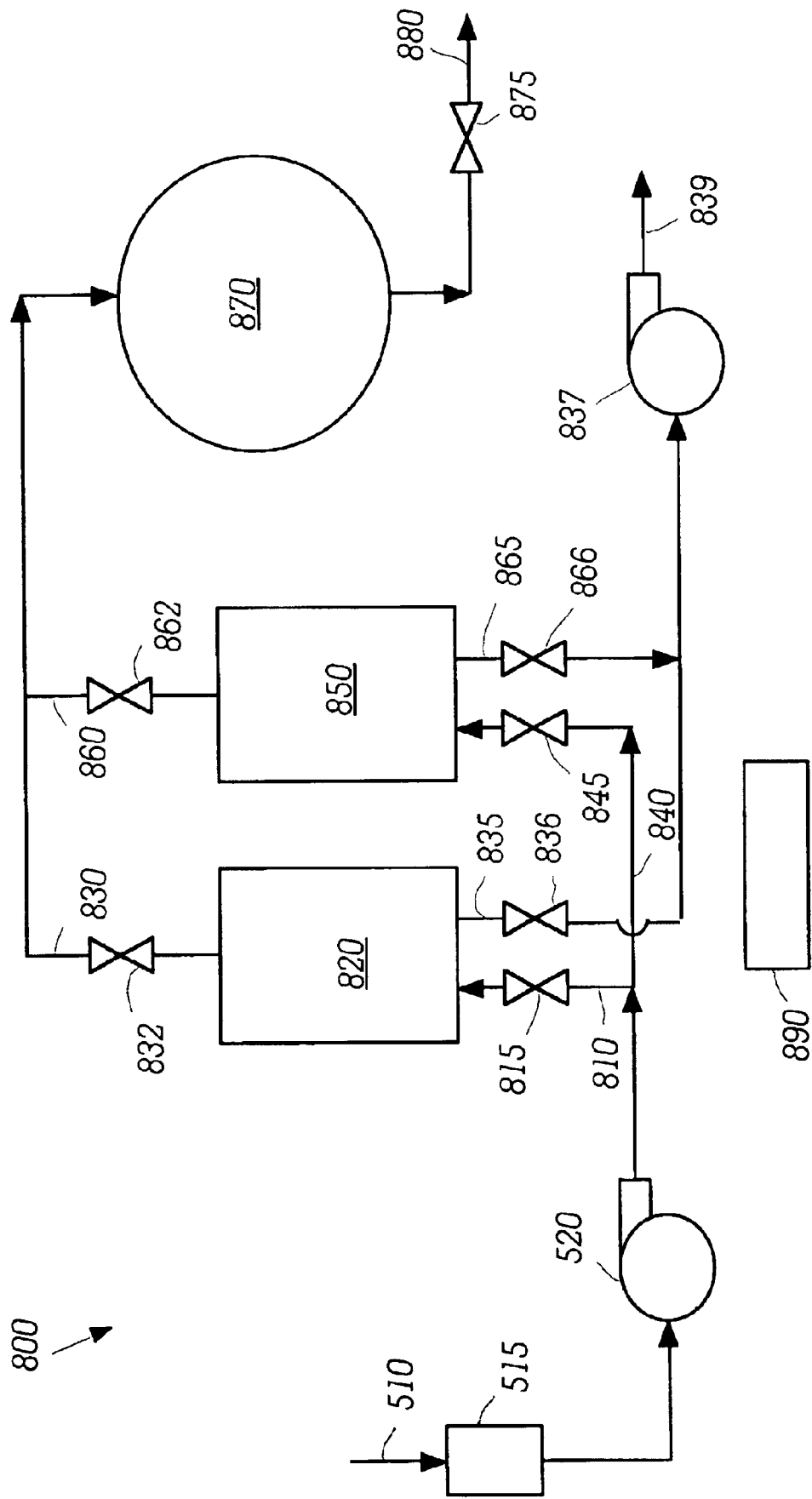
FIG. 15 is a schematic of a typical pressure swing adsorption plant for use as the air separation plant in one of the engines disclosed in FIGS. 12–14.

However, liquefaction processes are not the only processes that can remove at least a portion of nitrogen from air. Several other processes are available to achieve this goal. These processes, which are described in detail below, can be substituted for the cryogenic liquefaction process described in detail hereinabove. One alternative technique available for use in the air separation plant 530, 630, 730 is a pressure swing adsorption plant 800 (FIG. 15). The pressure swing adsorption process, also called vacuum pressure swing adsorption, uses materials which are capable of adsorption and desorption of oxygen or nitrogen such as, for example, synthetic zeolites. The vacuum pressure swing adsorption process can be used to separate oxygen and nitrogen from air.

The process typically employs two beds that go through swings in pressure from above atmospheric to below atmospheric pressure. Each bed cycles sequentially from adsorption to desorption and regeneration and back to adsorption. The two beds operate in a staggered arrangement in which one bed is adsorbing while the other bed is regenerating. Thus the beds alternately produce a gaseous product of high oxygen content. With this process, a gaseous mixture can be produced with a wide range of oxygen purities. As an example, oxygen purities ranging from 90% to 94% are used in many industrial applications and can be successfully produced with commercially available vacuum pressure swing adsorption processes such as those produced by Praxair, Inc. with world headquarters located at 39 Old Ridgebury Road, Danbury, Conn. 06810-5113.

With particular reference to FIG. 15, a layout of a typical pressure swing adsorption plant 800 is shown. Initially, the air inlet 510 and feed compressor 520 are provided analogous to the air inlet 510 and air compressor 520 of the basic low-polluting engine schematic 500 shown in FIG. 12. Preferably, a filter 515 is interposed between the air inlet and the feed compressor to filter particulates out of the air inlet stream. The compressed air discharged from the feed compressor 520 is directed to a first inlet line 810 passing through a first inlet line valve 815 and into a first enclosure 820.

The first enclosure 820 is provided with an appropriate material capable of adsorption and desorption of oxygen or nitrogen. One material that is used in these applications is zeolite. Two outlets are provided from the first enclosure 820 including a first oxygen outlet 830 coupled to the first enclosure 820 through a first valve 832 and a first nitrogen outlet 835 coupled to the first enclosure 820 through a first nitrogen valve 836. The first nitrogen outlet 835 leads to a nitrogen compressor 837 which raises the gases in the first nitrogen outlet 835 back to atmospheric pressure for discharge through nitrogen discharge 839. In fact, the first nitrogen outlet 835 and first oxygen outlet 830 do not contain pure oxygen or nitrogen but rather merely gases which are enriched in content with oxygen or nitrogen.

The first oxygen outlet 830 leads to a surge tank 870 with a valve 875 beyond the surge tank 870 and leading to an oxygen supply line 880. In parallel with the first enclosure 820, a second enclosure 850 is provided. The second enclosure 850 is similarly loaded with an appropriate material capable of adsorption and desorption of oxygen or nitrogen. A second inlet line 840 leads from the feed compressor 520 through a second inlet line valve 845 and into the second enclosure 850. A second oxygen outlet 860 leads out of the second enclosure 850 and on to the surge tank 870 through a second oxygen outlet valve 862. A second nitrogen outlet 865 also leads out of the second enclosure 850 through a second nitrogen outlet valve 866 and on to the compressor 837. A cycle controller 890 controls the opening and closing of the various valves 815, 832, 836, 845, 862, 866 and 875.

One typical operation sequence of the pressure swing adsorption plant 800 is as follows. Initially, all of the valves are closed except for the first nitrogen valve 836 and the nitrogen compressor 837 is used to reduce pressure in the first enclosure 820 to below atmospheric pressure. The first nitrogen valve 836 is then closed. Next, the first inlet valve 815 is opened. With the first inlet line valve 815 open and all other valves closed, the feed compressor directs air into the first enclosure 820.

As pressure builds up within the first enclosure 820, the material within the first enclosure 820 is caused to adsorb different molecules within the air in a discriminate fashion. For instance, the material can be selected to adsorb nitrogen at elevated pressure. At reduced pressure, the adsorption effect reverses to desorption.

In essence, if the material adsorbs nitrogen at pressures elevated above atmospheric pressure and desorbs nitrogen at pressures below atmospheric pressure, the various valves 815, 832, 836 and 875 are sequentially operated so that the first enclosure 820 has an elevated pressure and adsorbs nitrogen before the remaining enriched oxygen air is allowed to freely flow out of the first enclosure 820 along the first oxygen outlet 830. When the oxygen enclosure 820 has a pressure below atmospheric pressure, the material within the first enclosure 820 is desorbing the nitrogen while the first nitrogen outlet valve 836 is open. In this way, when nitrogen is being adsorbed, the remaining air within the first enclosure 820 is enriched in oxygen and is directed to the first oxygen outlet 830 and when the material within the enclosure 820 is desorbing the nitrogen, the nitrogen enriched gases within the first enclosure 820 are allowed to flow into the first nitrogen outlet 835 and to the nitrogen discharge 839.

The zeolite material within the enclosure 820 benefits from some residence time to adsorb as much nitrogen (or oxygen) as desired. During this time no oxygen rich or nitrogen rich gases flow to the oxygen supply line 880 or the nitrogen discharge 839. Hence, it is beneficial to use a second enclosure 850 similar to the first enclosure 820 while the valves 815, 832 and 836 are all closed and the zeolite material in the first enclosure 820 is adsorbing nitrogen (or oxygen).

Specifically the valves 845, 862 and 866 are sequentially opened and closed to cause the second enclosure 850 to operate in a manner similar to that outlined with reference to the first enclosure 820 above. When the material within the second enclosure 850 is adsorbing nitrogen (or oxygen) the process is reversed so that the first enclosure 820, having had its zeolite material appropriately desorbed, is brought back on line for repetition of the alternating pattern of use between the first enclosure 820 and the second enclosure 850. As should be apparent, additional enclosures besides the first enclosure 820 and second enclosure 850 could be utilized if the adsorbing material requires more residence time or to increase the overall throughput of oxygen enriched gases from the air. Over time, the material within the first enclosure 820 which adsorbs and desorbs the oxygen or nitrogen tends to lose its effectiveness. The material can be regenerated, if it is in the form of a synthetic zeolite, by application of heat or other regeneration means. Accordingly, when the material within the first enclosure 820 begins to lose its effectiveness, such a heat treatment can be performed or the zeolite material replaced. Should the adsorbing material be configured to adsorb and desorb oxygen rather than nitrogen, the above described operation of the pressure swing adsorption plant 800 would be adjusted to provide the desired separation of oxygen from nitrogen.

Figure 16:
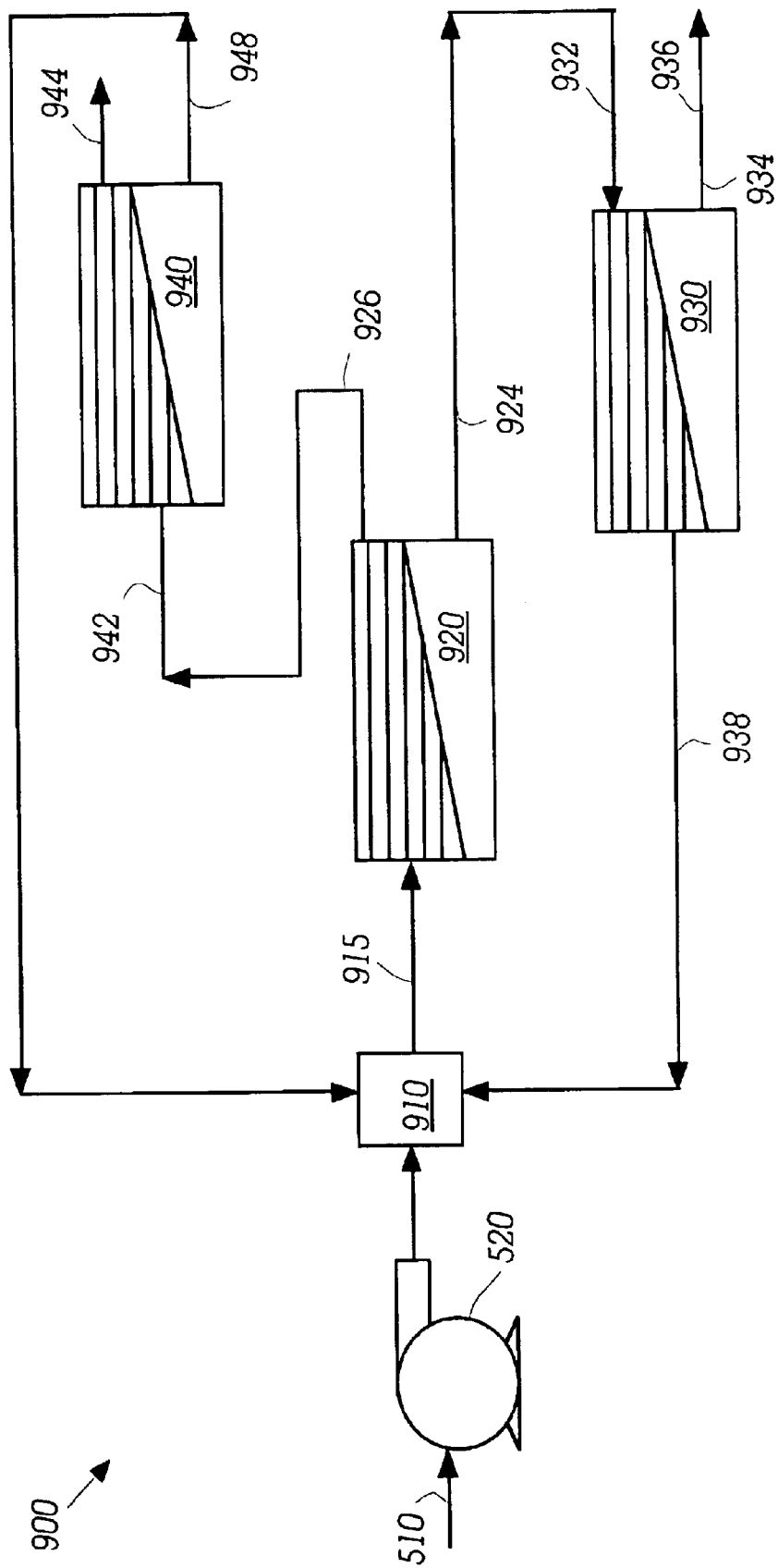
FIG. 16 is a schematic of a membrane flow two stage enrichment of oxygen and nitrogen system for use as part of the air separation plant of the cycles disclosed in FIGS. 12–14.

With particular reference to FIG. 16, details of an alternative apparatus and system for use within the air separation plants 530, 630, 730 is provided. In such membrane-based air separation systems 900 the separation of air into its components is achieved by passing an air feed stream under pressure over a membrane. The pressure gradient across the membrane causes the most permeable component to pass through the membrane more rapidly than other components, thereby creating a product stream that is enriched in this component while the feed stream is depleted in this component.

The transport of the air through a membrane can follow several physical processes. As an example, these processes could be: 1) Knudsen flow separation which is based on molecular weight differences between the gases; 2) Ultramicroporous molecular sieving separation; and 3) Solution-diffusion separation which is based both on solubility and mobility factors. In the case of a solution-diffusion process the air first dissolves in a polymer, then diffuses through its thickness and then evaporates from the other side into the product stream.

Several types of membranes are available for this process, each having specific advantages in particular situations. For example, cellulose acetate membranes exhibit good separation factors for oxygen and nitrogen, but have low flux rates. Thin film composite membranes placed over microporous polysulfone exhibits lower separation factors than cellulose acetate, but have a higher flux at the same pressure differential. Repeating the process in a series configuration can increase the oxygen concentration in the product stream. For example, one industrial membrane, in two passes, may enrich the oxygen content of air to about 50%.

The above described membrane processes operate at a temperature that is near ambient temperature. A higher-than-ambient temperature may arise as a result of a possible temperature rise resulting from pressurization of the air feed stream to create a pressure difference across the membrane.

Still another membrane separation process uses an electroceramic membrane. Electroceramics are ionic solid solutions that permit movement of ions. To become appreciably mobile, the oxide ion, because of its size and charge, requires a high temperature (about 800° F.) to overcome the solid oxide lattice energy. The electroceramic membrane process integrates well with the production of power described in this invention because the power generating process produces waste heat that can be used to generate the required operating temperature of the membrane. For instance, and with reference to FIG. 12, the expander 560 and gas generator 550 can be configured such that the working fluid exiting the expander 560 at the discharge 572 has a temperature at or above 800° F. The working fluid can then be routed to a heat exchanger which heats the electroceramic membranes to 800° F. for use in the air development system 530. Alternatively, a system such as that shown in FIGS. 17 and 18 can be utilized.

The oxygen ions move through the lattice because of a gradient in pressure across the membrane. On the high oxygen partial pressure side of the membrane, oxygen is reduced when it receives four electrons and occupies two vacancies. At the low oxygen partial pressure side, vacancies are created by the reverse reaction. Oxide ions at the low partial pressure side can be removed by liberation of oxygen. The rate of diffusion through the membrane is determined by ion mobility. This mobility is a characteristic of a particular material, and is dependent on the size, charge and geometry of the cations in the lattice. A possible material for formation of the electroceramic membrane is yttria stabilized zirconia.

With particular reference to FIG. 16, one arrangement for the membrane based air separation system for use in the air separation plants 530, 630, 730 is depicted by reference numeral 900. In this embodiment for the air separation plant, an air inlet 510 and feed compressor 520 are provided similar to the air inlet 510 and feed compressor 520 disclosed in FIG. 12 with regard to the basic low-polluting engine 500. The compressed air is then directed to a junction 910 where return flows from various membrane chambers return for reprocessing and are combined together within the junction 910. A junction outlet 915 provides the only outlet from the junction 910. The junction outlet 915 leads to a first membrane enclosure 920.

The first membrane enclosure 920 is preferably an enclosure which has an inlet and a membrane dividing the enclosure into two regions. Two outlets are provided in the enclosure. One of the outlets is on the same side of the membrane as the inlet and the other outlet is located on a side of the membrane opposite the inlet. If the membrane is of a type which allows oxygen to pass more readily there through than nitrogen, an oxygen rich outlet 924 is located on the downstream side of the membrane and a nitrogen rich outlet 926 is located on a same side of the membrane as the inlet 915. If the membrane allows nitrogen to pass more readily there through, the arrangement of the outlets is reversed.

The junction outlet 915 passes into the first membrane enclosure 920 through the inlet in the first membrane enclosure 920. Because oxygen flows more readily through the membrane within the first membrane enclosure 920, gases flowing through the oxygen rich outlet 924 have an increased percentage of oxygen with respect to standard atmospheric oxygen percentages and the nitrogen rich outlet 926 has a nitrogen content which is greater than that of standard atmospheric conditions.

The oxygen rich outlet 924 leads to a second membrane enclosure 930 where it enters the second membrane enclosure 930 through an oxygen rich inlet 932. The second membrane enclosure 930 is arranged similarly to the first membrane enclosure 920. Hence, a membrane is provided within the second membrane enclosure 930 and two outlets are provided including an oxygen super rich outlet 934 on a side of the membrane opposite the oxygen rich inlet 932 and a second outlet 938 located on a common side of the membrane within the second membrane enclosure 930 as the oxygen rich inlet 932.

The oxygen super rich outlet 934 leads to an oxygen supply 936 for use within one of the engines 500, 600, 700 discussed above. The gases flowing through the second outlet 938 typically have oxygen and nitrogen contents matching that of standard atmospheric conditions but maintaining an elevated pressure. The second outlet 938 returns back to the junction 910 for combining with air exiting the feed compressor 520 and for repassing through the first membrane enclosure 920 as discussed above.

The nitrogen rich outlet 926 exiting the first membrane enclosure 920 is passed to a third membrane enclosure 940 where it enters the third membrane enclosure 940 through a nitrogen rich inlet 942. The third membrane enclosure 940 is similarly arranged to the first membrane enclosure 920 and second membrane enclosure 930 such that a membrane is located within the third membrane enclosure 940 and two outlets are provided from the third membrane enclosure 940. One of the outlets is a nitrogen super rich outlet 944 on a side of the membrane within the third membrane enclosure 940 similar to that of the nitrogen rich inlet 942. The nitrogen super rich outlet 944 can lead to a surrounding atmosphere or be used for processes where a high nitrogen content gas is desirable.

A third permeate return 948 provides an outlet from the third membrane enclosure 940 which is on a side of the membrane within the third membrane enclosure 940 opposite the location of the nitrogen rich inlet 942. The third permeate return 948 leads back to the junction 910 for reprocessing of the still pressurized air exiting the third membrane enclosure 940 through the third permeate return 948. This air passing through the third permeate return 948 is typically similar in content to the second permeate return 938 and the air exiting the feed compressor 520.

While many different types of membranes can be utilized within the first membrane enclosure 920, second membrane enclosure 930 and third membrane enclosure 940, the type of membrane would typically not alter the general arrangement of the membrane enclosures 920, 930, 940 and conduits for directing gases between the various permeates 920, 930, 940 and other components of the membrane based air separation plant 900 of FIG. 16.

While various different techniques have been disclosed for separation of nitrogen and oxygen from air, this description is not provided to identify every possible air separation process or apparatus. For example, economic and other consideration may make application of combinations of the above described processes advantageous. Rather, these examples are presented to indicate that several separation processes are available to accomplish the goal of enriching the oxygen content of air supplied to a combustion device and decreasing a corresponding nitrogen content of the air supply to a combustion device. By reducing an amount of nitrogen passing into a combustion device such as these combustion devices 550, 650, 750, an amount of nitrogen oxides produced as products of combustion within the combustion device 550, 650, 750 is reduced and low-pollution combustion based power production results.

Cryogenic air separation is the current standard method for producing large daily tonnages of relatively pure oxygen that are needed for CES power plants. The cryogenic process represents a substantially mature technology that has advanced far along the classic "learning curve." The largest single train ASUs can now produce approximately 3500 tons per day (TPD) of oxygen, a quantity sufficient to support a CES power plant having roughly 200 Mwe output. Larger single train units (>5000 TPD) appear possible and do offer some modest improvement in economy-of-scale. Continued, although incremental, improvements in the technology, performance, and cost of some major components of ASUs such as specialty heat exchangers and compressors can also be expected. Some cost improvements will continue in the cryogenic air separation industry but the trend lines for the learning curve and economy-of-scale benefits predict smaller percentage improvements in the future. Thus, a major reduction in oxygen costs will require use of an advanced air separation technology.

One such advanced air separation technology is based on ion transport membranes (ITMs), also called ion transfer membranes. ITMs are solid materials that produce oxygen by the passage of oxygen ions through ceramic materials containing selected inorganic oxide materials. They operate at high temperatures, generally over 900° F. Oxygen molecules are converted to oxygen ions at the surface of the membrane and are transported through the membrane by an applied voltage or a pressure differential, reforming to oxygen molecules at the other membrane surface.

Figure 17:
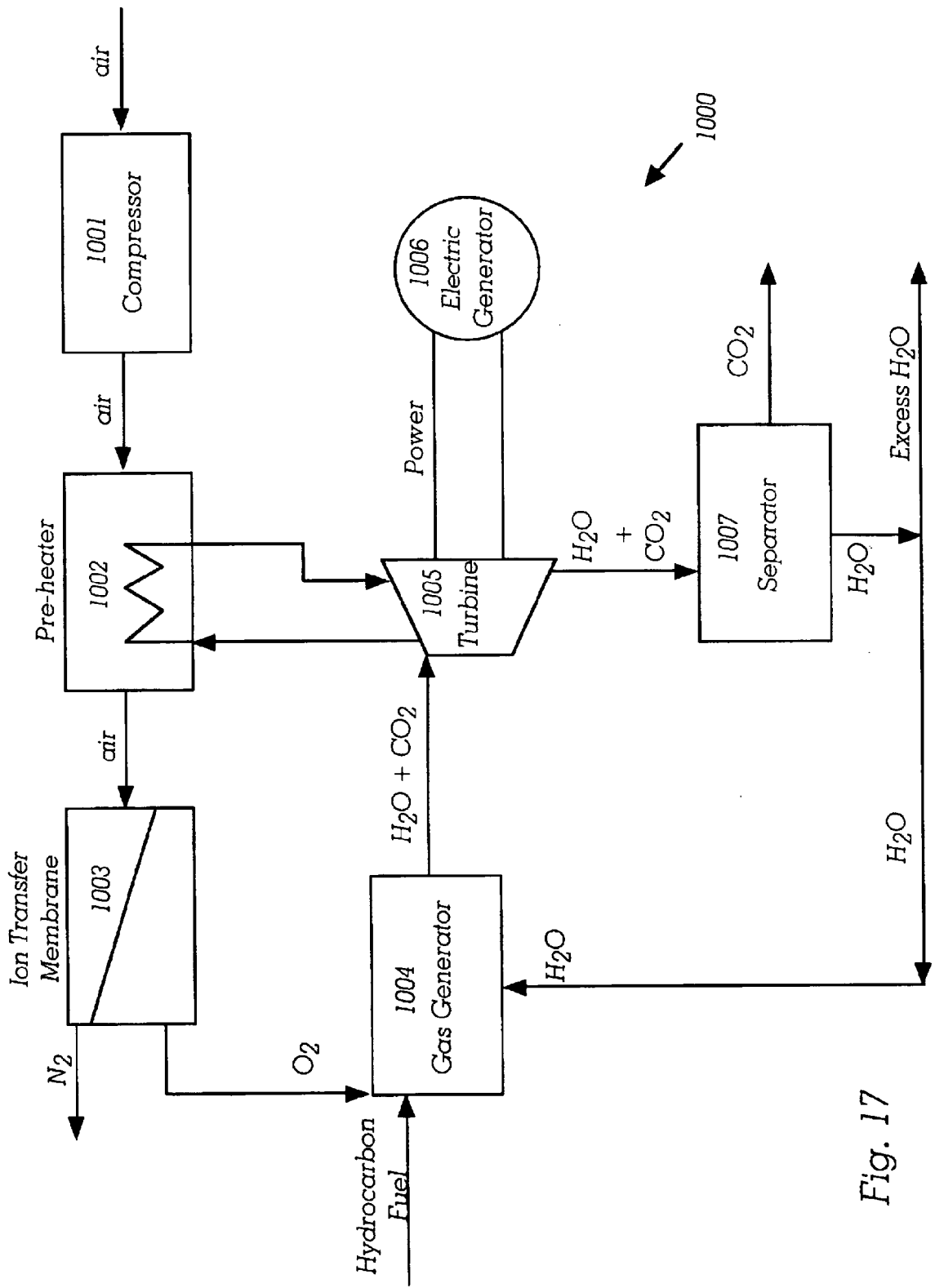
FIG. 17 is a schematic of a basic power generation system which includes a high temperature air separation unit, such as an ion transfer membrane.
Figure 18:
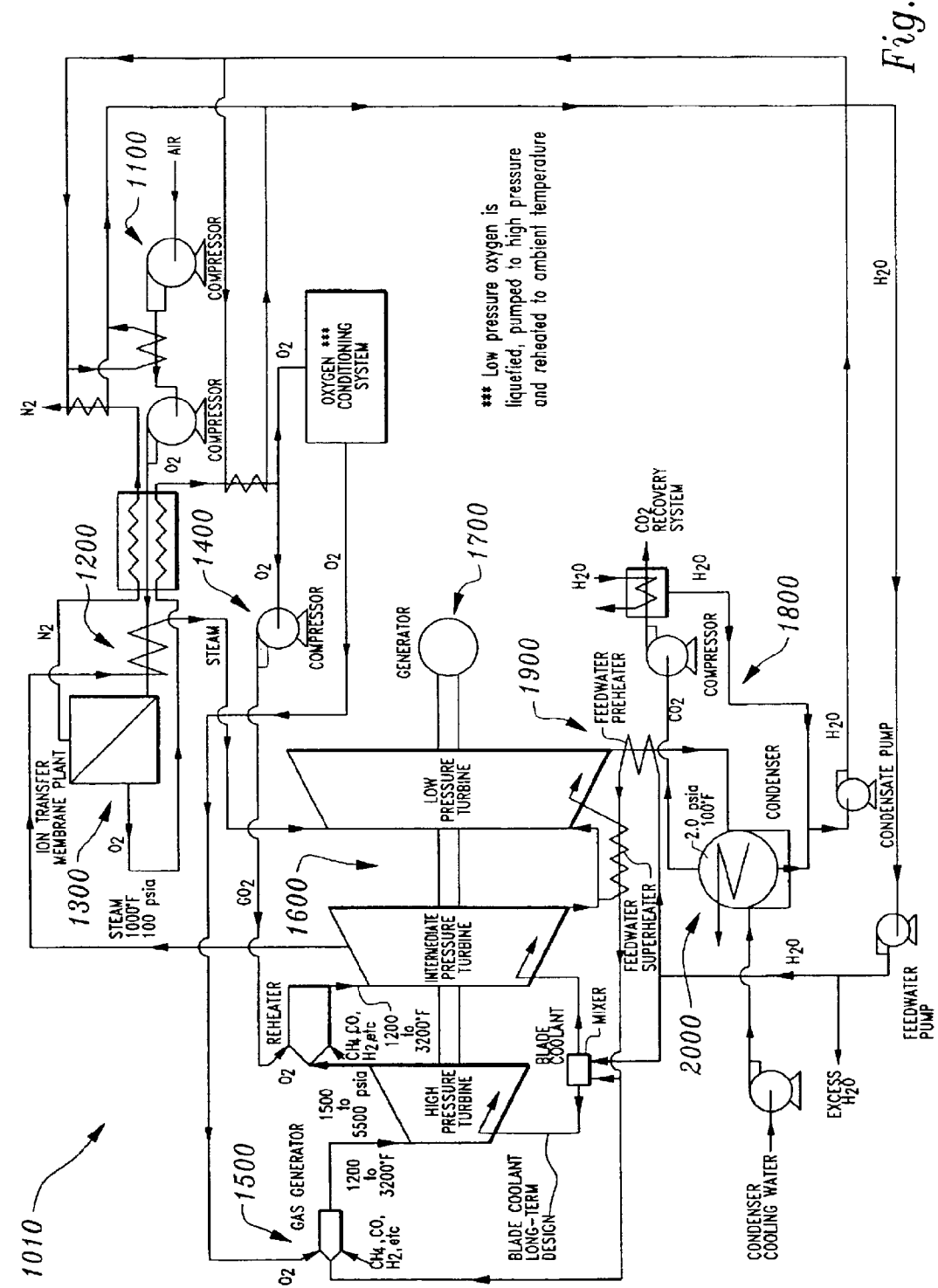
FIG. 18 is a schematic of a detailed power generation system which includes a high temperature air separation unit, such as an ion transfer membrane.

FIGS. 17 and 18 show such ITM technology integrated with a steam turbine power generation system to economically provide oxygen for combustion of hydrocarbon fuel, including coal, biomass, coke, natural gas, and other hydrocarbon fuels.

FIG. 17 shows a basic schematic for a power generation system which utilizes ion transfer membrane (ITM) technology as an air separation unit (ASU) to provide oxygen for combustion with a hydrocarbon fuel in a manner which does not generate pollutants including oxides of nitrogen, because nitrogen has been largely removed by the ITM.

Specifically, the air first enters a compressor 1001 to raise the air to an inlet pressure required for the ITM 1003. The pressurized air is then passed through a preheater 1002 so that the air is heated to a temperature required for the inlet to the ITM 1003. The air is then processed within the ITM 1003, separating at least a portion of the nitrogen from the air. An oxygen rich outlet from the ITM is characterized by having a greater percentage of oxygen than is present in the air entering the ITM 1003. Preferably, the oxygen rich outlet of the ITM 1003 is substantially pure oxygen. However, benefits will be derived according to this invention even if less than all of the nitrogen has been removed and if less than an entirely pure stream of oxygen is delivered to the gas generator 1004.

At the gas generator 1004, oxygen from the ITM is combusted with fuel to produce products of combustion including water and carbon dioxide. The fuel is a hydrocarbon fuel, including but not limited to one or more of the fuels, including natural gas, alcohols, coal, coke, biomass, and any other fuels which include at least some carbon so that carbon dioxide is generated within the gas generator 1004. In most cases, the fuel will additionally include at least a small amount of hydrogen so that water is also generated within the gas generator 1004. The gas generator 1004 also includes a water inlet, further increasing an amount of water exiting the gas generator 1004. This water is produced and recirculated from the gas generator 1004, such that an at least partially closed Rankine thermodynamic cycle is provided.

The exhaust from the gas generator 1004 including water and carbon dioxide is passed on to a turbine 1005. The turbine 1005 could be a single turbine, but would typically be a series of turbines with each turbine typically operating at a sequentially lower pressure and with each turbine operating at different temperatures optimized for capital cost and thermal efficiency. Most typically, the gas generator 1004 and turbine 1005 are to some extent integrated so that the gas generator 1004 is actually a first gas generator and multiple reheaters between separate downstream turbines. For simplicity, FIG. 17 depicts a single gas generator 1004 and a single turbine 1005. The turbine 1005 drives an electric generator 1006. The turbine 1005 also exhausts the working fluid from the gas generator 1004, including water and carbon dioxide from the turbine 1005 on to the separator 1007.

The water and carbon dioxide from the gas generator 1004 is preferably routed to the preheater 1002 so that the air is preheated by heat from the water and carbon dioxide before the air is passed to the ion transfer membrane 1003. The water and carbon dioxide which is directed to the preheater 1002 can be routed to the preheater 1002 before reaching the turbine 1005, between separate turbines within the turbine 1005, or taken from water and carbon dioxide exhausted from the turbine 1005 (or any combination of such routing arrangements).

The water and carbon dioxide entering the separator 1007 are typically separated by condensation of the water. Typically, the water and carbon dioxide are cooled to a temperature at which the water condenses into a liquid and the carbon dioxide remains gaseous. The carbon dioxide is discharged from the separator 1007 for sale as an industrial gas, storage or sequestration. Such sequestration can include atmospheric release when environmental conditions allow or disposal in sequestration sites such as underground for enhanced oil recovery or into underground regions where the carbon dioxide can be effectively contained, or into the oceans. The water exiting the separator is at least partially routed back to the gas generator 1004. Excess water is discharged from the system and provided for sale or discharged into the environment.

FIG. 18 illustrates this concept with a non-polluting efficient electrical energy power plant 1010, comprising an air induction subsystem 1100, air preheating subsystem 1200, an ion transfer membrane (ITM) air separation subsystem (ASU) 1300, a gas compression subsystem 1400, a gas generation subsystem 1500, a gas turbine drive subsystem 1600, an electric energy generation subsystem 1700, an exhaust management subsystem 1800, a regenerative water heating subsystem 1900, an H2O/CO2 separation subsystem 2000, and a gas separation/water management subsystem. The air induction subsystem 1100 feeds and controls the air supply to generate the oxygen needed by the plant 1010. The air is heated to approximately 900° F. with low energy steam from the steam turbine drive subsystem 1600 in the heat exchanger of the subsystem 1200. The warm air then enters the ion membrane plant 1300 where oxygen/nitrogen separation takes place. The nitrogen is collected, cooled, and sold as a byproduct or discharged back to the atmosphere. The nearly pure oxygen is collected, cooled and directed to the oxygen conditioning subsystem where the oxygen is either: (1) cooled, liquefied, pumped to high pressures and then heated to a gas or; (2) pumped to high pressure in the gaseous state and directed to the gas generation subsystem 1500. The method for achieving high pressure oxygen will depend on safety issues and/or customer preference. Fuel, such as natural gas, and water are also injected into the gas generation subsystem 1500 where combustion takes place to generate the turbine drive fluid of approximately 95% steam and 5% CO2 (by volume). The gas from the gas generation subsystem 1500, including a gas generator and optionally one reheater as shown and also further optionally other reheaters upstream of other lower pressure turbines, drives the turbines of subsystem 1600, with three turbines shown but other numbers of turbines utilizable, and generates electricity with subsystem 1700. The gas discharge from the reheated turbine drive subsystem 1600 then enters the exhaust management subsystem 1800 where the water condenses and the CO2 gases separate. The water is pumped to high pressure and recirculated back to the gas generation subsystem 1500 by means of the regenerated water subsystem 1900. The CO2 is pumped from the exhaust management subsystem 1800 by means of the carbon dioxide removal/conditioning subsystem and processed for sale as a byproduct, discharged to m atmosphere or prepared for sequestration into underground or deep ocean disposal sites. The cooling water for subsystem 1800, including condenser/separator 2000 or other cooling causes the water and CO2 to be separated. The water is then preheated before returned to the gas generator subsystem 1500.

The principle features of power plant 1010 include the integration of the ion transfer membrane (ITM) air separation unit (ASU) with a high efficiency steam turbine, subsystem 600, to produce low cost electricity and to permit CO2 separation, conditioning and preparation for sequestration into underground or undersea sequestration with the lowest cost energy penalty possible. All these features are achieved with zero emissions and thus permit a power generation system utilize the most abundant energy available, fossil fuels, without discharging any harmful pollutants or greenhouse gases.

FIGS. 19, 20, 22 and 23 show variations on the power plant shown in FIG. 18. The power plant variations FIGS. 19, 20, 22 and 23 primarily provide additional detail as to the compressors, intercoolers and other equipment required for the particular system depicted therein and configured to combust syngas. Syngas can be derived from a variety of different sources with the constituents of the syngas identified in the table of FIG. 21. Such a syngas can be produced by gasifying a fuel such as coal or biomass, or can be provided in the form of landfill gas or can otherwise be provided from various different sources.

The power plants depicted in FIGS. 19, 20, 22 and 23 each include the particular conditions existing at each of the components, including the pressure, temperature and flow rate of fluids passing through each of the components. Also, the power produced or the power consumed by each of the components is shown such that overall thermal efficiencies can be calculated.

Figure 19:
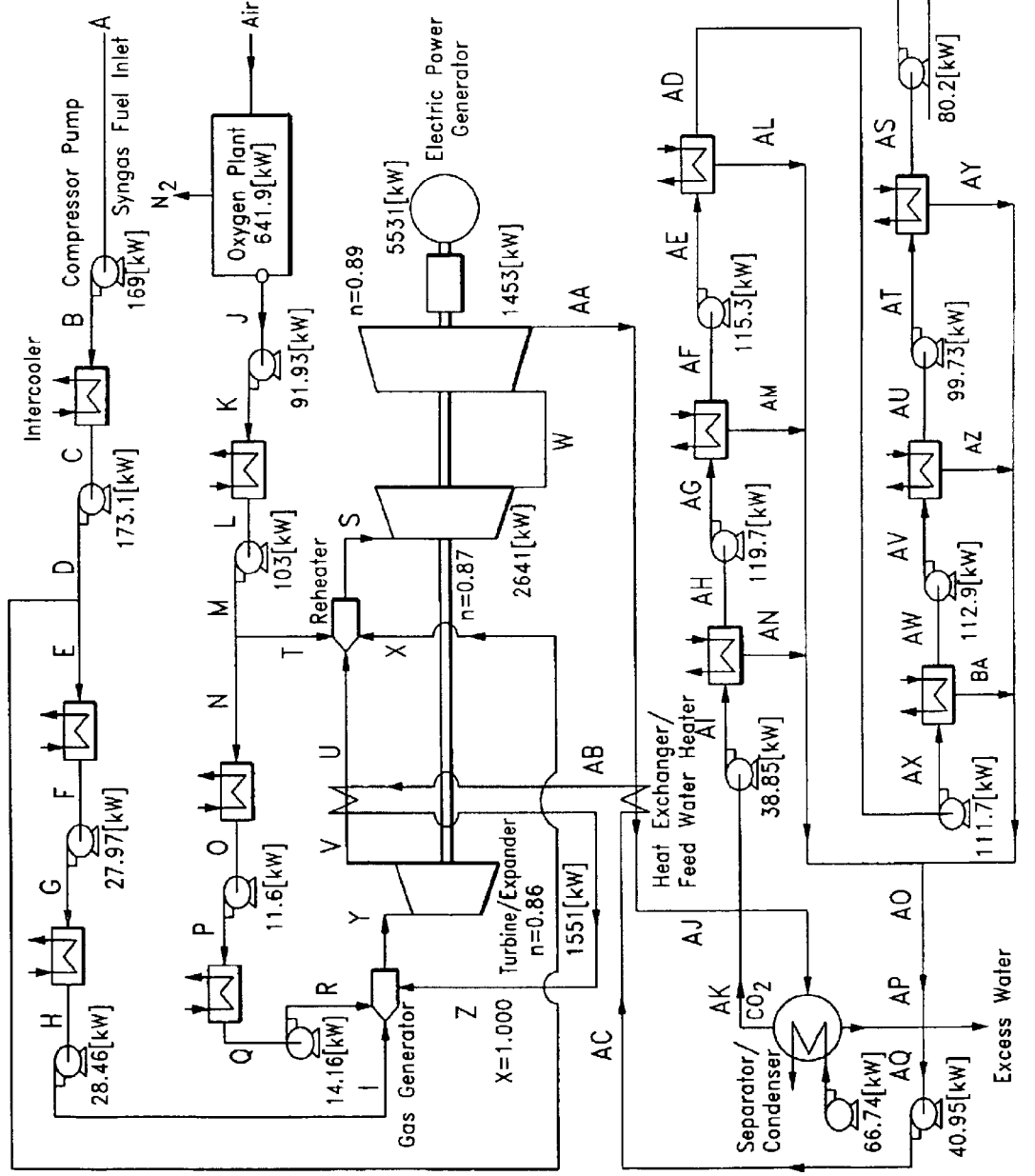
FIG. 19 is a schematic of a power plant particularly adapted to combust a syngas hydrocarbon fuel with oxygen through one gas generator and one reheater, and with three turbines and two feed water heaters, and with carbon dioxide sequestration.
Figure 20:
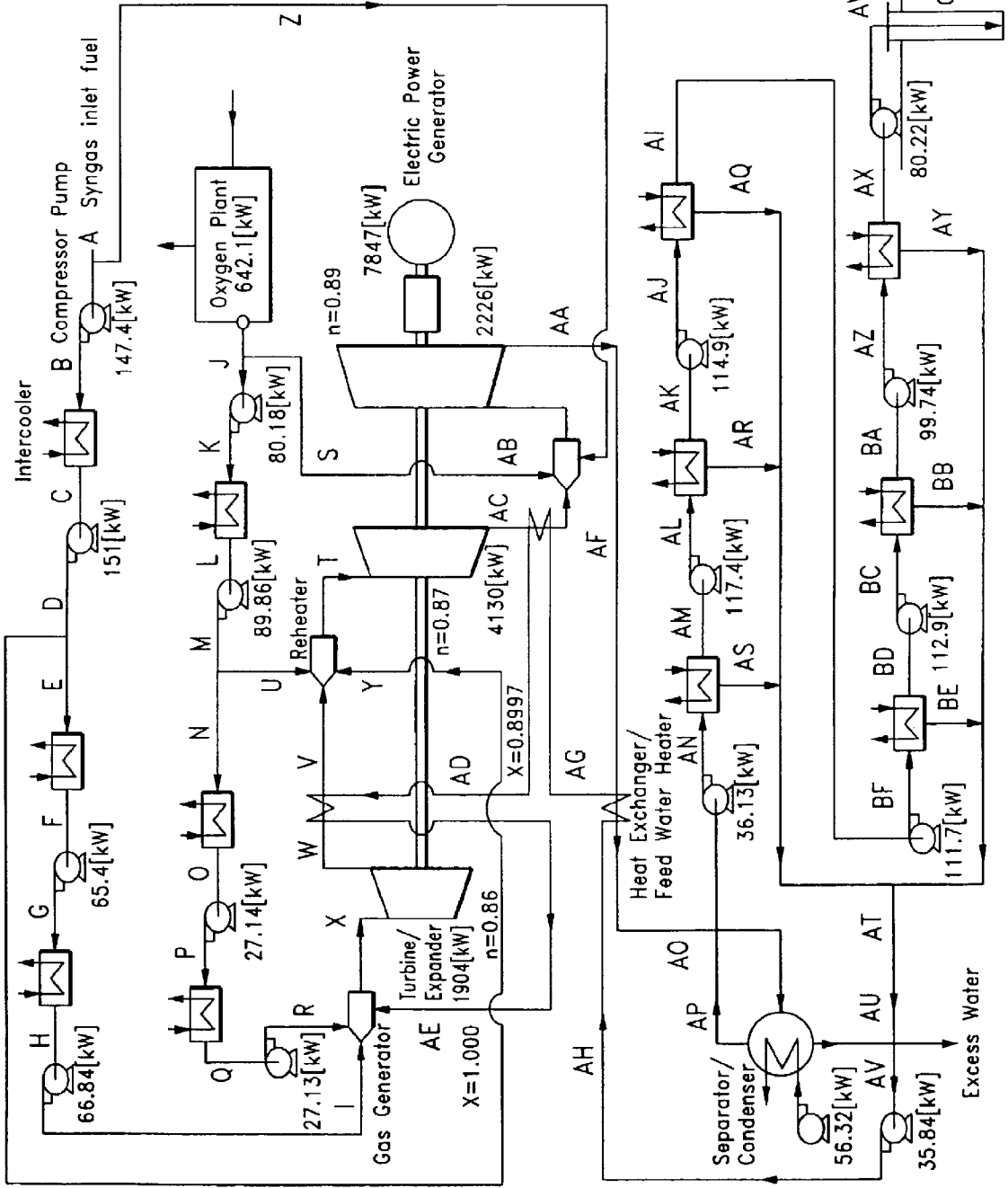
FIG. 20 is a power plant schematic for a particular power generation system similar to that of FIG. 19 but with two reheaters and three feed water heaters and operating at different pressures and temperatures.

In the power plant depicted in FIGS. 19 and 22, a power plant is depicted which includes one gas generator and one reheater as well as three turbines and two feed water heaters. When operating on syngas, at the temperatures and pressures identified, and when compressing the resulting carbon dioxide for sequestration, an overall thermal efficiency of 27.21% results. In the power plant depicted in FIGS. 20 and 23, one gas generator is provided along with two reheaters and three turbines, and with three feed water heaters. When the power plant of FIGS. 20 and 23 is operated with a syngas fuel, at the temperatures and pressures identified, and the carbon dioxide is pressurized for sequestration, an overall thermal efficiency of 44.97% results.

These systems can be altered such as by being configured to combust natural gas or other hydrocarbon fuels. Also, the temperatures and pressures of the components can be altered to optimize efficiency, to the extent the turbines, gas generators, reheaters and other components of the system can withstand the pressures and temperatures involved. The oxygen plants depicted in the power plants of FIGS. 19, 20, 22 and 23 can be based on any type of air separation unit. The particular components depicted in FIGS. 19, 20, 22 and 23 utilize cryogenic air separation. With the use of ion transport membrane (also called ion transfer membrane) technology, less power would be required for air separation and the efficiency of the power generation systems would increase significantly.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A low emissions hydrocarbon combustion power generation system featuring regenerative heating, comprising in combination:

an air separator adapted to separate at least a portion of oxygen from other constituents within ambient air entering said air separator through an oxygen outlet;

a source of hydrocarbon fuel;

a source of diluent;

a gas generator adapted to combust the fuel from said source of hydrocarbon fuel with oxygen from said oxygen outlet of said air separator to produce products of combustion including water and carbon dioxide, said gas generator including an outlet for the products of combustion, said gas generator adapted to add the diluent from said source of diluent to the products of combustion produced within said gas generator with a combination of the diluent and the products of combustion produced within the gas generator discharged through said gas generator outlet;

a first turbine downstream from said gas generator outlet, said turbine adapted to expand the products of combustion and the diluent, as well as output power, said first turbine having a discharge;

at least one diluent heater adapted to heat the diluent before the diluent enters said gas generator, said diluent heater in heat transfer relationship with the products of combustion downstream from said gas generator, such that at least a portion of heat within the products of combustion is transferred to the diluent before the diluent enters said gas generator;

wherein a reheater is located downstream from said first turbine discharge, said reheater adapted to combust hydrocarbon fuel from said source of hydrocarbon fuel with oxygen from said oxygen outlet of said air separator, and to mix the products of combustion produced within said gas generator and the diluent with products of combustion produced within said reheater to produce combined products of combustion discharged through a reheater outlet;

a second turbine downstream from said reheater, said second turbine adapted to expand the combined products of combustion and output power, and having a second turbine discharge; and said at least one diluent heater located downstream from said second turbine.

2. The system of claim 1 wherein a combustion products separator is located downstream from said first turbine, said combustion products separator including an inlet for the combined products of combustion and the diluent and at least two outlets including a primarily water outlet and a primarily carbon dioxide outlet, said primarily water outlet coupled to a feed water line leading to said source of diluent, such that said source of diluent is a source of primarily water diluent.

3. The system of claim 1 wherein said at least one diluent heater is located between a last turbine downstream from said gas generator and said combustion products separator.

4. A low emissions hydrocarbon combustion power generation system featuring regenerative heating, comprising in combination:

an air separator adapted to separate at least a portion of oxygen from other constituents within ambient air entering said air separator through an oxygen outlet;

a source of hydrocarbon fuel;

a source of diluent;

a gas generator adapted to combust the fuel from said source of hydrocarbon fuel with oxygen from said oxygen outlet of said air separator to produce products of combustion including water and carbon dioxide, said gas generator including an outlet for the products of combustion, said gas generator adapted to add the diluent from said source of diluent to the products of combustion produced within said gas generator with a combination of the diluent and the products of combustion produced within the gas generator discharged through said gas generator outlet;

a first turbine downstream from said gas generator outlet, said turbine adapted to expand the products of combustion and the diluent, as well as output power, said first turbine having a discharge;

at least one diluent heater adapted to heat the diluent before the diluent enters said gas generator, said diluent heater in heat transfer relationship with the products of combustion downstream from said gas generator, such that at least a portion of heat within the products of combustion is transferred to the diluent before the diluent enters said gas generator;

wherein a reheater is located downstream from said first turbine discharge, said reheater adapted to combust hydrocarbon fuel from said source of hydrocarbon fuel with oxygen from said oxygen outlet of said air separator, and to mix the products of combustion produced within said gas generator and the diluent with products of combustion produced within said reheater to produce combined products of combustion discharged through a reheater outlet;

a second turbine downstream from said reheater, said second turbine adapted to expand the combined products of combustion and output power, and having a second turbine discharge; and wherein said at least one diluent heater is located between said first turbine and said reheater downstream from said gas generator.

5. The system of claim 4 wherein a combustion products separator is located downstream from a last turbine, said separator including an inlet for the combined products of combustion and the diluent and at least two outlets including a primarily water outlet and a primarily carbon dioxide outlet, said primarily water outlet coupled to a feed water line leading to said source of diluent, such that said source of diluent is a source of primarily water diluent.

6. The system of claim 5 wherein a second diluent heater is located between said last turbine and said separator.

7. The system of claim 4 wherein a second reheater is located downstream from said second turbine discharge, said second reheater adapted to combust hydrocarbon fuel with oxygen, and to mix fluids from said second turbine discharge with products of combustion produced within said second reheater to produce combined products of combustion discharged through said second reheater outlet; and a third turbine downstream from said second reheater, said third turbine adapted to expand the combined products of combustion and output power, and having a third turbine discharge.

8. The system of claim 7 wherein a third diluent heater is located between said second turbine and said second reheater.

* * * * *